United States Patent
Nakamura et al.

(10) Patent No.: US 12,116,381 B2
(45) Date of Patent: *Oct. 15, 2024

(54) LIGNIN DERIVATIVE COMPOUND AND USE THEREOF

(71) Applicant: NIPPON PAPER INDUSTRIES CO., LTD., Kita-ku (JP)

(72) Inventors: Takuma Nakamura, Tokyo (JP); Akihiko Nakamura, Tokyo (JP); Sumio Tamura, Tokyo (JP); Kanae Takahashi, Tokyo (JP); Yoshito Nishimori, Tokyo (JP)

(73) Assignee: NIPPON PAPER INDUSTRIES CO., LTD., Kita-ku (JP)

( * ) Notice: Subject to any disclaimer, the term of this patent is extended or adjusted under 35 U.S.C. 154(b) by 222 days.

This patent is subject to a terminal disclaimer.

(21) Appl. No.: 16/639,924

(22) PCT Filed: Aug. 24, 2018

(86) PCT No.: PCT/JP2018/031453
§ 371 (c)(1),
(2) Date: Feb. 18, 2020

(87) PCT Pub. No.: WO2019/039609
PCT Pub. Date: Feb. 28, 2019

(65) Prior Publication Data
US 2020/0255465 A1    Aug. 13, 2020

(30) Foreign Application Priority Data

Aug. 24, 2017 (JP) ................. 2017-161647

(51) Int. Cl.
| | | |
|---|---|---|
| *C04B 11/00* | (2006.01) | |
| *C04B 7/02* | (2006.01) | |
| *C04B 24/18* | (2006.01) | |
| *C07G 1/00* | (2011.01) | |
| *C09K 23/50* | (2022.01) | |
| *C09K 23/52* | (2022.01) | |
| *C08H 7/00* | (2011.01) | |

(52) U.S. Cl.
CPC .............. *C07G 1/00* (2013.01); *C04B 7/02* (2013.01); *C04B 11/00* (2013.01); *C04B 24/18* (2013.01); *C08H 6/00* (2013.01)

(58) Field of Classification Search
CPC .. C07G 1/00; C04B 7/02; C04B 11/00; C04B 24/18; C04B 28/02; C04B 28/14; C04B 2103/408; C04B 24/22; C04B 24/20; C08H 6/00; C09H 7/00; C08L 97/005; C08L 97/00; C08G 14/06; C09K 23/50; C09K 23/52
See application file for complete search history.

(56) References Cited

U.S. PATENT DOCUMENTS

| | | |
|---|---|---|
| 3,095,392 A | 6/1963 | Herrick |
| 4,322,301 A | 3/1982 | Blackmore |
| 4,444,562 A | 4/1984 | Lin |
| 4,808,641 A | 2/1989 | Yagi et al. |
| 4,936,918 A | 6/1990 | Furuhashi et al. |
| 4,962,173 A | 10/1990 | Kinoshita et al. |
| 4,977,227 A | 12/1990 | Negami et al. |
| 5,087,648 A | 2/1992 | Kinoshita et al. |
| 5,092,934 A | 3/1992 | Furuhashi et al. |
| 5,290,869 A | 3/1994 | Kinoshita et al. |
| 5,466,289 A | 11/1995 | Yonezawa et al. |
| 11,873,433 B2 * | 1/2024 | Naumov ............... C01B 32/194 |

FOREIGN PATENT DOCUMENTS

| | | |
|---|---|---|
| AU | 23345/95 A | 1/1996 |
| CN | 101516801 | 8/2009 |
| CN | 102174273 A | 9/2011 |
| CN | 102294199 | 12/2011 |
| CN | 102395621 A | 3/2012 |
| CN | 104220472 A | 12/2014 |
| CN | 104530756 A | 4/2015 |
| CN | 105408011 | 3/2016 |
| EP | 0 291 590 A1 | 11/1988 |
| EP | 0 689 866 A1 | 1/1996 |
| EP | 3 835 365 A1 | 6/2021 |

(Continued)

OTHER PUBLICATIONS

JP-2015193804-A, machine translation (Year: 2015).*
Beran, E., Hull, S. & Steininger, M. The Relationship Between the Chemical Structure of Poly(alkylene glycol)s and Their Aerobic Biodegradability in an Aqueous Environment. J Polym Environ 21, 172-180 (2013). doi:0.1007/s10924-012-0445-2 (Year: 2013).*
Laidler. Britannica. Reaction Rate. Chemistry [retrieved from the internet at May 1, 2023 from <URL:https://www.britannica.com/science/reaction-rate>, way back: <https://web.archive.org/web/20150809233541/https://www.britannica.com/science/reaction-rate>]. (Year: 2015).*

(Continued)

*Primary Examiner* — Anthony J Green
*Assistant Examiner* — Marites A Guino-O Uzzle
(74) *Attorney, Agent, or Firm* — Oblon, McClelland, Maier & Neustadt, L.L.P.

(57) ABSTRACT

From the viewpoint of a decrease in environmental impact in recent years, an object of the present invention is to effectively utilize lignin as a circulative biomass resource having high effect of reducing environmental impact. Specifically, the object is to provide a lignin derivative that can improve the dispersibility of various substances to be dispersed regardless of uses of cements, dyes, oil field drilling mud, and the like. The present invention provides a lignin derivative compound that is a reaction product of a lignin sulfonic acid-based compound with an aromatic water-soluble compound, and a dispersant containing the same. The lignin derivative compound preferably has an anionic functional group and/or a polyalkylene oxide chain.

11 Claims, 1 Drawing Sheet

(56) References Cited

FOREIGN PATENT DOCUMENTS

| JP | 56-118093 | | 9/1981 |
|---|---|---|---|
| JP | 58-38380 | B2 | 8/1983 |
| JP | 59-18338 | B2 | 4/1984 |
| JP | 60-190482 | A | 9/1985 |
| JP | 62-68806 | A | 3/1987 |
| JP | 62-119147 | A | 5/1987 |
| JP | 62-216950 | A | 9/1987 |
| JP | 1-113419 | A | 5/1989 |
| JP | 1-145358 | A | 6/1989 |
| JP | 1-226757 | A | 9/1989 |
| JP | 4-149056 | A | 5/1992 |
| JP | 5-36377 | B2 | 5/1993 |
| JP | 5-147991 | A | 6/1993 |
| JP | 5-170501 | A | 7/1993 |
| JP | 6-191918 | A | 7/1994 |
| JP | 6-271347 | A | 9/1994 |
| JP | 6-298555 | A | 10/1994 |
| JP | 7-267705 | A | 10/1995 |
| JP | 8-26905 | A | 1/1996 |
| JP | 2508113 | B2 | 6/1996 |
| JP | 2000-273348 | A | 10/2000 |
| JP | 2002-146028 | A | 5/2002 |
| JP | 5769930 | B2 | 8/2015 |
| JP | 2015193804 | A * | 11/2015 |
| JP | 2016-121321 | A | 7/2016 |
| JP | 2016-196540 | A | 11/2016 |

OTHER PUBLICATIONS

Agilent. Polymer Molecular Weight Distribution and Definition of MW Averages. Technical Overview. [retrieved from the internet at May 3, 2023 from <URL:https://www.agilent.com/cs/library/technicaloverviews/Public/5990-7890EN.pdf>] (Year: 2015).*

Combined Chinese Office Action and Search Report issued May 12, 2021 in Patent Application No. 201880054555.0 (with English translation and English translation of Category of Cited Documents), 20 pages.

Bai Meng-xian, et al., "Research and Application of Lignin-based Dye Dispersants," Biomass Chemical Engineering, vol. 46, No. 6, Nov. 2012, pp. 35-39 (with English Abstract).

Zhang Yanlin, et al., "Applied Progress of the Lignosulphonates Dispersant," Guangdong Chemical Industry, vol. 6, 2006, 4 pages (with English Abstract).

Extended European Search Report issued Mar. 16, 2021 in corresponding European Patent Application No. 18848697.1, 6 pages.

International Search Report issued on Oct. 30, 2018 in PCT/JP2018/031453 filed on Aug. 24, 2018, 2 pages.

Office Action issued Jul. 12, 2022, in corresponding Japanese Patent Application No. 2019-537720 (with English-language Translation).

Chinese Notification to Grant Patent Right for Invention dated Apr. 25, 2022, in corresponding Chinese Patent Application No. 201880054555.0 (with English-language Translation).

European Office Action issued Feb. 20, 2023 in European Patent Application No. 18 848 697.1, 4 pages.

* cited by examiner

LIGNIN DERIVATIVE COMPOUND AND USE THEREOF

FIELD

The present invention relates to a lignin derivative compound and use thereof.

BACKGROUND

Lignin is a natural macromolecular component present in wood. In a pulp industry where wood is used as a raw material, lignin is generated on a large scale and a commercial scale. For example, kraft lignin is obtained from a kraft pulp waste liquid, and lignin sulfonic acid is obtained from a sulfite pulp waste liquid. Kraft lignin, lignin sulfonic acid, or a processed product thereof is widely used as a dispersant in a wide range of industrial fields of dyes, hydraulic compositions (for example, cement and gypsum), inorganic and organic pigments, coal-water slurries, agricultural chemicals, ceramics, oil field drilling mud, and the like.

For example, Patent Literature 1 discloses use of a modified lignosulfonate, of which the sulfone group amount and the carboxyl group amount, and the molecular weight are controlled, as a dye dispersant. Patent Literature 2 discloses use of a graft copolymer of lignin sulfonic acid having a predetermined range of molecular weight distribution with an acrylic or vinyl-based monomer as a cement dispersant. Patent Literature 3 discloses a graft copolymer of acrylic acid with lignosulfonate that serves as a dispersion stabilizer for oil field drilling mud. Patent Literature 4 discloses a lignin derivative including a reaction product of lignosulfonate with a water-soluble monomer having a polyalkylene oxide chain.

CITATION LIST

Patent Literature

Patent Literature 1: Japanese Patent Application Laid-Open No. 2002-146028 A
Patent Literature 2: Japanese Patent Application Laid-Open No. Hei. 01-145358 A
Patent Literature 3: U.S. Pat. No. 4,322,301
Patent Literature 4: Japanese Patent No. 5769930

SUMMARY

Technical Problem

However, the conventional lignin-based dispersants described above have insufficient performance.

From the viewpoint of a decrease in environmental impact in recent years, it is an object of the present invention to effectively utilize lignin as a circulative biomass resource. Specifically, it is an object of the present invention to provide a lignin derivative compound that can improve the dispersibility of various substances to be dispersed regardless of uses of hydraulic compositions, dyes, inorganic and organic pigments, coal-water slurries, agricultural chemicals, ceramics, oil field drilling mud, and the like.

Solution to Problem

The inventors of the present invention have intensively studied to achieve the objects, and as a result, found that a lignin derivative compound that is a reaction product of a lignin sulfonic acid-based compound with an aromatic water-soluble compound exhibits high dispersibility. Thus, the inventors have found that the objects are achieved.

The present invention provides the following.

[1] A lignin derivative compound that is a reaction product of a lignin sulfonic acid-based compound with an aromatic water-soluble compound.
[2] The lignin derivative compound according to [1], wherein the lignin derivative has an anionic functional group.
[3] The lignin derivative compound according to [1] or [2], wherein the lignin derivative has a polyalkylene oxide chain with an average addition molar number of an alkylene oxide of 25 or more.
[4] The lignin derivative compound according to any one of [1] to [3], wherein a reaction weight ratio ([L]/[M]) of the lignin sulfonic acid-based compound [L] and the aromatic water-soluble compound [M] is 1 to 99/99 to 1.
[5] The lignin derivative compound according to any one of [1] to [4], wherein the aromatic water-soluble compound contains one or more selected from the group consisting of an aromatic compound having a polyalkyleneoxide chain, an aromatic compound having a carboxyl group, and an aromatic compound having a sulfo group.
[6] The lignin derivative compound according to any one of [1] to [5], wherein the aromatic water-soluble compound has a reaction rate of 50% or more.
[7] A dispersant comprising the lignin derivative compound according to any one of [1] to [6].
[8] The dispersant according to [7], which is a hydraulic composition dispersant.
[9] The dispersant according to [8], wherein the hydraulic composition dispersant is a cement dispersant or a gypsum dispersant.
[10] The dispersant according to [7], which is a muddy water dispersant for oil field drilling.
[11] The dispersant according to [7], which is a dye dispersant.
[12] A method for producing the lignin derivative compound according to any one of [1] to [6], comprising the step of reacting a lignin sulfonic acid-based compound with an aromatic water-soluble compound.
[13] A hydraulic composition comprising a hydraulic material, water, and the dispersant according to [8] or [9].
[14] The hydraulic composition according to [13], which is a cement composition or a gypsum composition.

Advantageous Effects of Invention

A lignin derivative compound of the present invention can exert significantly higher dispersibility for various substances to be dispersed than that of a conventional lignin-derived dispersant. Therefore, the lignin derivative compound of the present invention can be used as a dispersant for a variety of substances to be dispersed. The lignin derivative compound can also be used in a field where the lignin-derived dispersant has not been used.

When the conventional lignin-based dispersant is used for a hydraulic composition, and particularly for a cement composition, a delay in setting time may occur. In contrast, when the dispersant of the present invention is used in dispersion of the cement composition, a setting time is short, and better dispersibility may be exerted than that when the conventional dispersant is used. When the dispersant of the present invention is used in dispersion of a gypsum composition, better dispersibility may be exerted than that when the conventional dispersant is used, and setting may be achieved rapidly.

The lignin derivative compound of the present invention can exert dispersibility regardless of temperature conditions, and can exert high dispersibility even at high temperature. When a dispersant containing the lignin derivative compound of the present invention is used in dispersion of petroleum drilling mud, excellent thermal properties are exerted, and higher dispersibility can be exerted than that when the conventional dispersant is used. When the dispersant of the present invention is used in dispersion of a dye, good dispersibility can be exerted even after dyeing at high temperature. Therefore, the dispersant of the present invention can exert higher dyeing affinity than that of the conventional dispersant.

DESCRIPTION OF EMBODIMENTS

1. Lignin Derivative Compound

Figure 1:
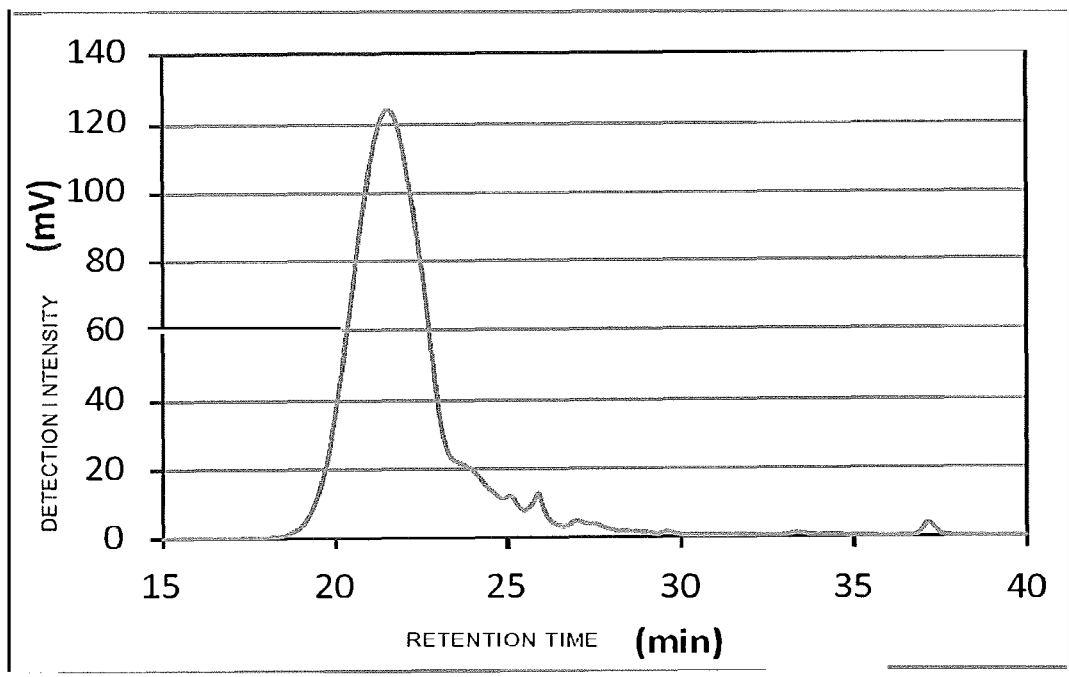
FIG. 1 is a GPC chart of a lignin derivative compound obtained in Example 1, measured by UV.

In the present invention, the lignin derivative compound is a reaction product of a lignin sulfonic acid-based compound with an aromatic water-soluble compound. The lignin derivative compound is generally a polymer including a constituent unit derived from the lignin sulfonic acid-based compound and a constituent unit derived from the aromatic water-soluble compound.

It is preferable that the lignin derivative compound has an anionic functional group and/or a polyalkylene oxide chain in the molecule. The dispersibility of a dispersant thus obtained from such a lignin derivative compound can be improved.

The anionic functional group means a functional group that forms an anionic form in water, and examples thereof may include a hydroxyl group, a carboxyl group, a sulfo group (sulfonic acid group), a phosphoric group, and a phenolic hydroxyl group. In particular, a carboxyl group and a sulfo group are preferable. The anionic functional group in the lignin derivative compound may be contained in the constituent unit derived from the aromatic water-soluble compound, in a moiety constituting the lignin sulfonic acid-based compound, or in both the constituent unit and the moiety.

The anionic functional group in the lignin derivative compound may be observed quantitatively and qualitatively by instrumental analysis such as NMR and IR.

The lignin derivative compound preferably has a polyalkylene oxide chain in its molecule. The number of carbon atoms of the alkylene oxide unit constituting the polyalkylene oxide chain is not particularly limited, and is usually 2 to 18, preferably 2 to 4, and more preferably 2 to 3. Examples of the alkylene oxide unit may include an ethylene oxide unit, a propylene oxide unit, and a butylene oxide unit, and an ethylene oxide unit or a propylene oxide unit is preferable. The average addition molar number of the alkylene oxide unit is preferably 25 or more, more preferably 30 or more, and still more preferably 35 or more. The alkylene oxide unit with such an average addition molar number can improve the dispersibility. The upper limit thereof is preferably 300 or less, more preferably 200 or less, and still more preferably 150 or less. The alkylene oxide unit with such an average addition molar number can suppress a decrease in dispersion retention capability. Thus, the average addition molar number is preferably 25 to 300, more preferably 30 to 200, and even more preferably 35 to 150. The polyalkylene oxide chain in the lignin derivative compound may be contained in the constituent unit derived from the lignin sulfonic acid-based compound, in the constituent unit derived from the aromatic water-soluble compound, or in both the units. It is preferable that the polyalkylene oxide chain is contained in the latter of them. The polyalkylene oxide chain in the molecule may be quantitatively and qualitatively observed by instrumental analysis such as NMR and IR.

Hereinafter, the lignin sulfonic acid-based compound, the aromatic water-soluble compound, and production of the lignin derivative compound will be described in this order.

1-1. Lignin Sulfonic Acid-Based Compound

The lignin sulfonic acid-based compound is a compound having a skeleton in which cleavage has been caused at a carbon in an α-position of side chain of a hydroxyphenylpropane structure of lignin and a sulfo group has been introduced. A structure of moiety of the aforementioned skeleton is represented by the formula (1).

[Chemical formula 1]

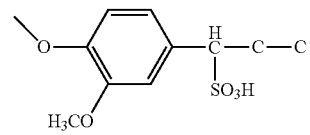

(1)

The lignin sulfonic acid-based compound may be a modified product of the compound having the skeleton represented by the aforementioned formula (1) (hereinafter referred to as a "modified lignin sulfonic acid-based compound"). A modification method is not particularly limited, and examples thereof may include a chemical denaturation and modification method such as hydrolysis, alkylation, alkoxylation, sulfonation, formation of sulfonic acid ester, sulfomethylation, aminomethylation, and desulfonation; and a method for molecular weight fractionation by ultrafiltration of the lignin sulfonic acid-based compound. In particular, the chemical denaturation and modification method is preferably one or two or more types of reactions selected from hydrolysis, alkoxylation, desulfonation, and alkylation.

The lignin sulfonic acid-based compound may have a salt form. Examples of the salt may include a monovalent metal salt, a divalent metal salt, an ammonium salt, and an organic ammonium salt. In particular, a calcium salt, a magnesium salt, a sodium salt, and a calcium-sodium mixed salt are preferable.

A method for producing the lignin sulfonic acid-based compound and a substance from which the lignin sulfonic acid-based compound is derived are not particularly limited. The substance may be a natural product or a synthetic product. The lignin sulfonic acid-based compound is one of main components of a sulfite pulp waste liquid obtained by cooking wood under an acidic condition. Therefore, a lignin sulfonic acid-based compound derived from the sulfite pulp waste liquid may be used.

Since a large amount of the lignin sulfonic acid-based compound (modified lignin sulfonic acid-based compound) is contained in a commercially available product, the commercially available product may be used in the present invention. Examples of the commercially available product may include VANILLEX HW (manufactured by Nippon Paper Industries Co., Ltd.), SAN X M (manufactured by Nippon Paper Industries Co., Ltd.), PEARLLEX NP (manufactured by Nippon Paper Industries Co., Ltd.), and SUN-FLO RH (manufactured by Nippon Paper Industries Co., Ltd.).

The lignin sulfonic acid-based compound generally has at least one functional group moiety that can be reacted with the aromatic water-soluble compound. Examples of such a moiety may include a carboxyl group, a hydroxyl group (a phenolic hydroxyl group and an alcoholic hydroxyl group), a thiol group, a sulfo group, an aromatic ring, an ether bond, and an alkyl chain.

1-2. Aromatic Water-Soluble Compound

The aromatic water-soluble compound means a compound having at least one aromatic skeleton and exhibiting water-solubility. The aromatic water-soluble compound is preferably a compound that can be reacted with the sulfite pulp waste liquid, that is, the main component of the sulfite pulp waste liquid, and a compound that can be chemically bonded with a functional group contained in the lignin sulfonic acid-based compound (for example, a phenolic hydroxyl group, an alcoholic hydroxyl group, a carboxyl group, a thiol group, or the like) is preferable. The type of chemical reaction is not particularly limited, and a radical reaction, an ionic bond, a coordination bond, a condensation reaction, a reaction accompanied by hydrolysis, a reaction accompanied by dehydration, a reaction accompanied by oxidation, a reaction accompanied by reduction, a reaction accompanied by neutralization, and the like are exemplified. The aromatic water-soluble compound preferably has at least one polar group. The aromatic water-soluble compound having at least one polar group can improve reactivity with the lignin sulfonic acid-based compound. The polar group may be an ionic functional group. Examples of the polar group may include various functional groups such as a carboxyl group, a hydroxyl group, a sulfo group, a nitroxyl group, a carbonyl group, a phosphoric acid group, an amine group, and an epoxy group. As the aromatic water-soluble compounds, one type thereof may be solely used, and two or more types thereof may also be used in combination.

Examples of the aromatic water-soluble compound may include the following [A] to [C]. The aromatic water-soluble compound may be at least one selected from [A] to [C], and only [A] or a combination of [A] and [B] and/or [C] is more preferable.

[A] Aromatic Compound Having Polyalkylene Oxide Chain

The number of carbon atoms of the alkylene oxide unit constituting the polyalkylene oxide chain (group) is not particularly limited, and is usually 2 to 18, preferably 2 to 4, and more preferably 2 to 3. Examples of the alkylene oxide unit may include an ethylene oxide unit, a propylene oxide unit, and a butylene oxide unit, and an ethylene oxide unit or a propylene oxide unit is preferable. The average addition molar number of the alkylene oxide unit is preferably 25 or more, more preferably 30 or more, and still more preferably 35 or more. The alkylene oxide unit with such an average addition molar number can improve the dispersibility. The upper limit thereof is preferably 300 or less, more preferably 200 or less, and still more preferably 150 or less. The alkylene oxide unit with such an average addition molar number can suppress a decrease in dispersion retention capability. Thus, the average addition molar number is preferably 25 to 300, more preferably 25 to 200 or 30 to 200, and even more preferably 25 to 150 or 35 to 150. Note that the above-mentioned average addition molar number is a rough standard, and regardless of whether or not the above-mentioned range is satisfied, [A] may have a group (a monoalkylene oxide group) in which alkylene oxide units are not repeatedly added.

The polyalkylene oxide chain may be composed solely of an alkylene oxide group or two or more types thereof. The addition form of each alkylene oxide group of the polyalkylene oxide chain composed of two or more types of alkylene oxide groups may be random, blocked, or a mixture thereof. The terminal unit of the polyalkylene oxide chain is usually, but not limited to, a hydroxyl group. It may be an alkyl ether or a carboxylic acid ester as long as it does not interfere with bonding to the lignin sulfonic acid-based compound.

Examples of [A] may include addition products in which an oxyalkylene group is added to an aromatic compound such as phenol, cresol, nonylphenol, naphthol, methylnaphthol, butylnaphthol, bisphenol A, and bisphenol S. Specific examples thereof may include polyalkylene oxide alkyl phenyl ethers, polyalkylene oxide phenyl ethers, polyalkylene oxide alkyl naphthyl ethers, and polyalkylene oxide naphthyl ethers. Among these, benzene ring derivatives are preferable because co-condensation property thereof may be improved. At least one selected from polyalkylene oxide alkylphenyl ethers and polyalkylene oxide phenyl ethers is more preferable. At least one selected from polyalkylene oxide phenyl ethers (in particular, addition products in which an oxyalkylene group is added to phenol) is further preferable (for example, poly(ethylene oxide) monophenyl ethers and poly(propylene oxide) monophenyl ethers, where the preferable ranges of the average addition molar number of the ethylene oxide unit and the propylene oxide unit are as described above). As [A], one type thereof may be solely used, and two or more types thereof may also be used in combination.

[B] Aromatic Compound Having Carboxyl Group

Examples of [B] may include naphthalene ring or benzene ring derivatives having at least one carboxyl group. More specific examples thereof may include isophthalic acid, oxynaphthoic acid, benzoic acid, hydroxybenzoic acid, and isomers of these. Because of good reactivity, o-hydroxybenzoic acid, m-hydroxybenzoic acid, and p-hydroxybenzoic acid are preferable. As [B], one type thereof may be solely used, and two or more types thereof may also be used in combination.

[C] Aromatic Compound Having Sulfo Group

Examples of [C] may include an alkylnaphthalenesulfonic acid, an alkylphenolsulfonic acid, aniline sulfonic acid, and an alkylbenzenesulfonic acid. More specific examples may include naphthalenesulfonic acid, methylnaphthalenesulfonic acid, butylnaphthalenesulfonic acid, phenolsulfonic acid, cresolsulfonic acid, aniline sulfonic acid, benzenesulfonic acid, toluenesulfonic acid, isomers of these, and condensates of these. Examples of the condensates may include naphthalenesulfonic acid formaldehyde condensates. Because of good reactivity, a phenol derivative having a sulfo group and aniline sulfonic acid are preferable, and phenol sulfonic acid and aniline sulfonic acid are more preferable. As [C], one type thereof may be solely used, and two or more types thereof may also be used in combination.

[D] Other Monomers (Optional)

In the production of the lignin derivative compound, other monomers [D] may be used within a range not impairing the effect of the present invention. [D] may be any monomer (aromatic compound) other than [A] to [C], and [D] itself may or may not be water-soluble. Examples thereof may include (alkyl)phenols such as phenol and cresol; and simple aromatic hydrocarbon compounds such as benzene and naphthalene. As [D], one type thereof may be solely used, and two or more types thereof may also be used in combination.

In the present invention, although the ratio of the reaction of the aromatic water-soluble compound is not particularly specified, the ratio of [A]:[B]:[C]:[D] is preferably 50 to 100% by weight: 0 to 50% by weight: 0 to 50% by weight: 0 to 10% by weight, provided that [A]+[B]+[C]+[D]=100% by weight.

1-3. Production of Lignin Derivative Compound

The lignin derivative compound may be produced by a method for reacting the lignin sulfonic acid-based compound with the aromatic water-soluble compound. A method for chemically bonding the lignin sulfonic acid-based compound to the aromatic water-soluble compound (a method for bonding a functional group (for example, a phenolic hydroxyl group, an alcoholic hydroxyl group, a carboxyl group, or a thiol group) in the lignin sulfonic acid-based compound to a functional group in the aromatic water-soluble compound, or a method for reacting the aromatic skeleton moiety of the lignin sulfonic acid-based compound with the aromatic water-soluble compound) may be appropriately adopted. In general, examples thereof may include a method for condensing the aromatic water-soluble compound with the lignin sulfonic acid-based compound (for example, formaldehyde condensation), a radical reaction, and an ionic bond. For example, the lignin derivative compound can be obtained by a method in which formaldehyde is added to the lignin sulfonic acid-based compound, and the lignin sulfonic acid-based compound is bonded to the aromatic water-soluble compound; or a method in which a hydrogen radical is drawn by an action of a radical initiator on the lignin sulfonic acid-based compound, or the like, and the generated radical is subjected to a radical reaction with at least one type of aromatic water-soluble compound.

As the lignin sulfonic acid-based compound used as a raw material in the production, processed powder obtained by a treatment such as a powder drying treatment may be used. The powdered lignin sulfonic acid-based compound can facilitate its handling. Examples of the method may include a method in which formaldehyde is added to the lignin sulfonic acid-based compound to cause a reaction of the lignin sulfonic acid-based compound with the aromatic water-soluble compound, and a method in which the lignin sulfonic acid-based compound is reacted with a radical initiator, and then reacted with an aromatic water-soluble monomer.

A reaction temperature may be appropriately set according to a solvent used. The reaction temperature is not particularly limited, and is usually 0° C. to 200° C., and preferably 45° C. to 150° C. When a compound having a low boiling point is used as a reaction solvent, it is preferable that the reaction is caused under pressure with an autoclave to improve the reaction rate.

When an aromatic water-soluble compound is reacted with a lignin sulfonic acid-based compound, either a solution reaction or a bulk reaction can be used. In the case of a solution reaction, a solvent may be used. Examples of the solvent may include water; alcohols such as methyl alcohol, ethyl alcohol, and isopropyl alcohol; aromatic hydrocarbons such as benzene, toluene, and xylene; aliphatic hydrocarbons such as cyclohexane and n-hexane; esters such as ethyl acetate; ketones such as acetone and methyl ethyl ketone; and cyclic ethers such as tetrahydrofuran and dioxane. As these solvents, one type thereof may be solely used, and two or more types thereof may also be used in combination (for example, a water-alcohol mixed solvent). Of these, it is preferable to use at least one of water and a lower alcohol, and among them it is more preferable to use water. This makes it possible to cope with the solubility of the raw material monomer and the copolymer obtained, and omit the solvent removing step.

It is difficult that the chemical structure of the lignin derivative compound is uniformly specified by a general formula or the like. This is because lignin having a skeleton of the lignin sulfonic acid-based compound constituting the lignin derivative compound has a significantly complicated molecular structure.

The weight-average molecular weight of the lignin derivative compound is not particularly limited, and is preferably 1,000 to 500,000, more preferably 2,000 to 300,000, and further preferably 5,000 to 100,000. In the present invention, the weight-average molecular weight may be measured by a publicly known method for conversion in terms of polyethylene glycol using gel permeation chromatography (GPC).

A measurement condition of GPC is not particularly limited, and examples thereof include the following conditions.

Measurement device: manufactured by TOSOH CORPORATION

Column used: Shodex Column OH-pak SB-806HQ, SB-804HQ, SB-802.5HQ

Eluent: 0.05 mM sodium nitrate/acetonitrile 8/2 (v/v)

Standard substance: polyethylene glycol (available from TOSOH CORPORATION or GL Sciences Inc.)

Detector: differential refractometer (manufactured by TOSOH CORPORATION)

In the present invention, the reaction weight ratio ([L]/[M]) of the lignin sulfonic acid-based compound [L] constituting the lignin derivative compound and the aromatic water-soluble compound [M] is not particularly limited, and the lignin sulfonic acid-based compound/the aromatic water-soluble compound (% by weight) is preferably 99 to 1/1 to 99 (% by weight), more preferably 90 to 2/10 to 98 (% by weight), and further preferably 70 to 5/30 to 95 (% by weight). When the ratio of the aromatic water-soluble compound [M] is 1.0% by weight or more, the lignin derivative compound to be obtained can exert a performance inherent in the lignin skeleton, that is, an effect of improving the dispersibility. When the ratio of the aromatic water-soluble compound [M] is 99% by weight or less, the molecular weight falls within an appropriate range, and exertion of cohesive properties can be suppressed to exert a dispersion performance. The ratio [L]/[M] is defined as (the weight of a solid content of the lignin sulfonic acid-based compound before the reaction)/(the weight of a solid content of the aromatic water-soluble compound before the reaction), and is also measured in this way in Examples described below.

In the present invention, the reaction rate of the aromatic water-soluble compound is preferably 50% or more, more preferably 60% or more, and further preferably 70% or more. When the reaction rate is 50% or more, the dispersibility of the lignin derivative compound to be obtained can be favorably exerted. The reaction rate of the aromatic water-soluble compound can be measured as follows, and is measured in this way in Examples described below. In gel permeation chromatography (GPC) measurement, peak areas before and after the reaction using UV (detection wavelength: 280 nm) are compared to each other. The reaction rate is represented by ([b]−[a])/[b] wherein [b] is the peak area before the reaction and [a] is the peak area after the reaction.

In synthesis of the lignin derivative compound, addition of water may be adjusted to control the condensation viscosity and the condensation time. The pH in the reaction may be adjusted to an appropriate value. The reaction is usually performed under an acidic condition. When a reaction system is already acidic due to the aromatic compound having a sulfo group and an unreacted acid contained in the aromatic compound, the reaction may be performed as it is in an acidic region. When the reaction system is not acidic, the reaction may be performed after an acid catalyst such as hydrochloric acid, phosphoric acid, sulfuric acid, nitric acid, or p-toluenesulfonic acid is added to adjust the pH to 2 or less. The preferable acid is sulfuric acid. The acid may be an acid other than the specific examples, and is not limited to a specific acid.

In synthesis of the lignin derivative compound, a defoamer may be used. The defoamer can suppress foaming in the reaction, whereby a uniform reaction system can be formed.

In synthesis of the lignin derivative compound, it is preferable that the reaction is stably advanced. When the reaction is caused by solution polymerization, the dissolved oxygen concentration at 25° C. in the used solvent may be adjusted to a range of preferably 5 ppm or less, more preferably 0.01 ppm to 4 ppm, further preferably 0.01 ppm to 2 ppm, and the most preferably 0.01 ppm to 1 ppm. The dissolved oxygen concentration may be adjusted in a reaction vessel, or the adjustment may be completed before the reaction.

Advancement of the reaction is characterized by an obvious increase in viscosity. When the viscosity reaches a desired viscosity, the reaction may be stopped by cooling or neutralization.

In a preferable embodiment, a reaction solution after completion of a condensation reaction is subjected to a post-treatment with heat at a temperature of 60° C. to 120° C. and a pH of 8.0 to 13.0. The post-treatment with heat is usually performed consecutively for 10 minutes to 3 hours. As a result, the aldehyde content (for example, the formaldehyde content) in the reaction solution can be significantly decreased. In addition to or instead of removal of free formaldehyde by a so-called Cannizzaro reaction as described above, for example, another method for decreasing an excess of formaldehyde, which is a known method in a chemical field of a melamine-formaldehyde resin and a phenol-formaldehyde resin, may be used. Examples of the method may include addition of a formaldehyde absorbent (addition of a small amount of sodium hydrogen sulfite and addition of hydrogen peroxide).

In the present invention, the pH of the reaction solution may be adjusted to 1.0 to 4.0, preferably 1.5 to 2.0, to precipitate a reaction product as a solid and sediment the reaction product at a bottom of a reaction container. In this case, a salt aqueous solution as a supernatant is then separated and removed. A free reaction product in which the most of the remaining substance contains no salt is dissolved again in water in an amount that can achieve a desired solid concentration. Thus, the lignin derivative compound can be obtained.

For the neutralization, a neutralizing agent that can neutralize the reaction product and the catalyst may be used. Examples of the neutralizing agent may include a basic compound (including a salt thereof and a hydroxide thereof), and examples of the basic compound may include sodium hydroxide, calcium hydroxide, and $Ba(OH)_2$. The neutralizing agent forms calcium sulfate and barium sulfate, which are less soluble, together with free sulfuric acid, and precipitates them in a form of gypsum. Therefore, the precipitate can be separated and removed by subsequent filtration, to obtain a polymer containing no salt. Further, undesired sodium sulfate may be separated and removed by dialysis or ultrafiltration.

When a by-product such as sodium sulfate, calcium sulfate, or a hydrate thereof is generated in the addition of the basic compound and the neutralization, it is preferable that the basic compound is added in a heated state after the reaction, and the heated state is kept to improve the removability of the by-product. Heating is preferably heating to 40° C. or higher. A retention time of the heated state is preferably 30 minutes or longer.

The lignin derivative compound is not limited as long as it is a reaction product obtained by the aforementioned reaction. The lignin derivative compound may be a free acid or a neutralized salt thereof. The neutralized salt is preferable since storage and use of the polymer are easy. Examples of the neutralized salt of the reaction product may include an alkali metal salt such as a sodium salt or a potassium salt; an alkali earth metal salt such as a calcium salt; an ammonium salt; and a salt of an organic amine.

After completion of the reaction, the obtained lignin derivative compound may be subjected to adjustment of concentration, as necessary.

2. Dispersant

The dispersant of the present invention contains the lignin derivative compound. Therefore, excellent dispersibility can be developed, and the dispersant can be used in various uses.

2-1. Substance to be Dispersed

A substance to be dispersed using the dispersant of the present invention is not particularly limited, and examples thereof may include organic substances and inorganic substances.

Examples of the Organic Substances may Include the Following Substances:

organic pigments such as fast yellow, disazo yellow, disazo orange, naphthol red, a copper phthalocyanine-based pigment, phosphomolybdic tungstic acid salts, tannic acid salts, cetanol, TAMOL lake, isoindolinone yellow greenish, isoindolinone yellow reddish, quinacridone, dioxazine violet, perinone orange, perylene vermilion, perylene scarlet, perylene red, and perylene marron;

synthetic resins such as polycarbonate, polyvinyl chloride, polymethyl methacrylate, and a fluororesin; and metal soaps such as aluminum stearate, zinc stearate, calcium stearate, magnesium stearate, a zing stearate-calcium stearate composite, lead stearate, cadmium stearate, barium stearate, calcium laurate, and zinc laurate.

The average particle diameter of the organic substance is generally 100 μm or less, and preferably 0.1 μm to 50 μm. As these organic substances, one type thereof may be solely used, and two or more types thereof may also be used in combination.

Examples of the inorganic substances may include the following substances:

silicates such as kaolin, aluminum silicate, clay, talc, mica, calcium silicate, sericite, and bentonite;

carbonates such as calcium carbonate, magnesium carbonate, barium carbonate, and basic lead carbonate;

sulfates such as calcium sulfate and barium sulfate;

chromates such as strontium chromate and pigment yellow;
molybdates such as zinc molybdate, calcium molybdate, and magnesium molybdate;
metal oxides such as alumina, antimony oxide, titanium oxide, cobalt oxide, triiron tetraoxide, diiron trioxide, trilead tetraoxide, lead monoxide, chromium oxide green, tungsten trioxide, and yttrium oxide;
metal hydroxides such as aluminum hydroxide, magnesium hydroxide, calcium hydroxide, iron hydroxide, and metatitanic acid;
metal carbides such as silicon carbide, tungsten carbide, boron carbide, and titanium carbide; and
aluminum nitride, silicon nitride, boron nitride, zirconia, barium titanate, satin white, carbon black, graphite, chrome yellow, mercury sulfide, ultramarine, Paris blue, titanium yellow, chrome vermilion, lithopone, copper acetoarsenite, nickel, silver, palladium, and lead zirconate titanate.

The average particle diameter of the inorganic substance is generally 100 μm or less, and preferably 0.1 μm to 50 μm. As these inorganic substances, one type thereof may be solely used, and two or more types thereof may also be used in combination.

The shape of the substance to be dispersed is not particularly limited, and examples thereof may include powder, particulate, granular, fiber, and flat plate shapes.

2-2. Dispersion Medium

A dispersion medium which can be used when the substance to be dispersed (for example, the above-mentioned organic substance and/or inorganic substance) is dispersed using the lignin derivative compound of the present invention is not particularly limited, and examples thereof may include the following substances:
water;
fuel oils such as kerosene petroleum, light oil, and kerosene;
aliphatic hydrocarbons such as hexane, isohexane, cyclohexane, methylcyclohexane, and isooctane;
aromatic hydrocarbons such as benzene, toluene, xylene, and cresol;
alcohols such as ethanol, methanol, isopropyl alcohol, butyl alcohol, and pentyl alcohol;
esters such as ethyl acetate and dioctyl phthalate;
ethers such as diethylene glycol, triethylene glycol, tetraethylene glycol, polyethylene glycol, polypropylene glycol, ethylene glycol monobutyl ether, carbitol, monoglyme, diglyme, tetraglyme, methyl cellosolve, and butyl cellosolve;
diols such as ethylene glycol, propylene glycol, butanediol, pentanediol, and hexanediol;
halogenated hydrocarbons such as 1,1,1-trichloroethane, trichloroethylene, dichloroethylene, and chlorodifluoromethane;
ketones such as methyl isoamyl ketone, methyl isobutyl ketone, acetone, and methyl ethyl ketone; and
terpineol, liquid paraffin, mineral spirit, N-(2-hydroxyethyl)pyrrolidone, and glycerol.

Among these dispersion media, water is suitable. As these dispersion media, one type thereof may be solely used, and two or more types thereof may also be used in combination.

2-3. Method for Using Dispersant

The method for using the dispersant of the present invention is not particularly limited. For example, the dispersant of the present invention may be mixed with a dispersion medium and then the substance to be dispersed is added thereto, or the dispersant of the present invention may be added to the dispersion medium simultaneously with or sequentially with the substance to be dispersed. Alternatively, the dispersant of the present invention may be added later after mixing the dispersion medium with the substance to be dispersed in advance. Further, the dispersant of the present invention may be mixed with the substance to be dispersed in advance, and then the dispersion medium may be added afterwards.

The use amount of the dispersant of the present invention may be appropriately adjusted according to the type and amount of the substance to be dispersed, and is not particularly limited. For example, the use amount is preferably 0.01 part by weight to 10 parts by weight, and more preferably 0.1 part by weight to 5 parts by weight, relative to 100 parts by weight of the substance to be dispersed. The use amount of the dispersion medium is usually 20 parts by weight to 1,000 parts by weight relative to 100 parts by weight of the substance to be dispersed.

2-4. Contained Amount of Lignin Derivative Compound

The contained amount of the lignin derivative compound, which is the active component in the dispersant of the present invention, is preferably 25% by weight to 100% by weight, and more preferably 50% by weight to 100% by weight, relative to the total weight of the dispersant. The dispersant of the present invention can be blended with other known additives other than the lignin derivative compound, which is the active component in the present invention, to the extent that the object thereof is not impaired.

2-5. Use of Dispersant

The dispersant of the present invention can be utilized in the aforementioned various uses. Examples thereof may include a hydraulic composition dispersant (for example, a cement dispersant and a gypsum dispersant), a muddy water dispersant for oil field drilling, a dye dispersant, a chelating agent, a cleaning agent, a flocculant, a thickener, a coating agent, a coating material, an adhesive, and a water-absorbing resin. Among these, a hydraulic composition dispersant, a muddy water dispersant for oil field drilling, and a dye dispersant are preferable, and a hydraulic composition dispersant is more preferable.

3. Hydraulic Composition Dispersant

Hereinafter, a case where the dispersant of the present invention is used as a hydraulic composition dispersant will be described in detail.

3-1. Method for Using Hydraulic Composition Dispersant

A form of use of the dispersant as a hydraulic composition dispersant is not particularly limited. For example, the dispersant may be used in an aqueous solution form or in a powder form. Examples of a method for making the dispersant into a powder form may include a method in which the dispersant is neutralized with a hydroxide of a divalent metal such as calcium or magnesium into a multivalent metal salt, and then dried, a method in which the dispersant is supported on inorganic powder such as silica-based fine powder, and then dried, a method in which the dispersant is dried and solidified on a support of a dryer (for example, a drum-type dryer, a disk-type dryer, or a belt-type dryer) into a thin film, and then pulverized, and a method in which the dispersant is dried and solidified with a spray drier. When the dispersant of the present invention (for example, in a powder form) is used as a hydraulic composition dispersant, the dispersant may be mixed in a hydraulic composition containing no water, such as cement powder or dry mortar, the dispersant may be a hydraulic composition that is a premix product used in plastering, floor covering, grout, or the like, or the dispersant may be mixed during kneading of a cement composition. The shape of the premix product is not particularly limited, and may be a powder, liquid, or paste form.

3-2. Substance to be Dispersed of Hydraulic Composition Dispersant

Examples of a substance to be dispersed when the dispersant of the present invention is used as the hydraulic composition dispersant may include various hydraulic materials. The hydraulic materials are classified into a cement composition such as cement or gypsum, and another hydraulic material, but may be any of these. The dispersant of the present invention may constitute a hydraulic composition as the hydraulic composition dispersant with the hydraulic material and water. The hydraulic composition may further contain a fine aggregate (sand, etc.) and a coarse aggregate (crushed stone, etc.), as necessary. Specific examples of the hydraulic material may include cement paste, mortar, concrete, and plaster.

In the hydraulic composition, a cement composition (a composition containing the dispersant of the present invention, cement, and water as essential components) in which cement is used as a hydraulic material is the most common, and is one of preferable embodiments of the present invention. Hereinafter, an aspect of a dispersant (cement dispersant) in which the hydraulic composition contains cement will be described.

Cement that can be used for the cement composition is not particularly limited, and specific examples thereof may include the followings:

portland cement (in ordinary, early-strength, high-early-strength, medium-thermal, sulfate resistance, and low alkaline forms thereof);
various types of mixed cement (blast furnace cement, silica cement, and fly ash cement);
white portland cement;
alumina cement;
ultra rapid hardening cement (one-clinker rapid hardening cement, two-clinker rapid hardening cement, and magnesium phosphate cement);
cement for grout;
oil well cement;
low-exothermic cement (low-exothermic blast furnace cement, fly ash mixing low-exothermic blast furnace cement, and high-content belite cement);
ultra-high strength cement;
cement-based solidification material; and
ecocement (cement produced from one or more types of ash from incinerated general municipal wastes and sewage sludge incineration ash as a raw material).

The cement composition may contain a component other than the cement. Examples of such a component may include the followings:

fine powder (blast furnace slag, fly ash, cinder ash, clinker ash, husk ash, silica fume, silica powder, limestone powder, etc.);
gypsum; and
an aggregate (gravel, crushed stone, granulated slag, recycled aggregate, and refractory aggregates such as silica refractory aggregate, argillaceous refractory aggregate, zircon refractory aggregate, high alumina refractory aggregate, silicon carbide refractory aggregate, graphite refractory aggregate, chromium refractory aggregate, chrome-magnesium refractory aggregate, and magnesia refractory aggregate).

The unit water amount per cubic meter of the cement composition, the use amount of the cement, and the ratio (by weight) of water to the cement are not particularly limited, and can be used widely from poor mixing to rich mixing.

The unit water amount is preferably 100 kg/m$^3$ to 185 kg/m$^3$, and more preferably 120 kg/m$^3$ to 175 kg/m$^3$. The use amount of the cement is preferably 200 kg/m$^3$ to 800 kg/m$^3$, and more preferably 250 kg/m$^3$ to 800 kg/m$^3$. The ratio (by weight) of water to the cement is preferably 0.15 to 0.7, and more preferably 0.25 to 0.65.

The dispersant of the present invention may be used in the cement composition at a high water reduction ratio region, that is, a region where the water/cement ratio (by weight) is low (for example, 0.15 to 0.5). The dispersant is effective for high-strength concrete in which the unit cement amount is high and the water/cement ratio is low and poor mix concrete in which the amount of the cement used (unit cement amount) is small (for example, approximately 300 kg/m$^3$ or less).

When the dispersant of the present invention is used, for example, for mortar or concrete that is used for a hydraulic cement, the mixing amount of the dispersant in the cement composition is preferably 0.01% by weight or more, more preferably 0.02% by weight or more, and further preferably 0.05% by weight or more in terms of solid content relative to the weight of the cement. The upper limit thereof is preferably 10.0% by weight or less, more preferably 7.0% by weight or less, and further preferably 5.0% by weight or less. Therefore, the mixing amount of the dispersant is preferably 0.01% by weight to 10.0% by weight, more preferably 0.02% by weight to 7.0% by weight, and further preferably 0.05% by weight to 5.0% by weight. The cement composition with such a mixing amount of the dispersant can provide various preferable effects such as a decrease in unit water amount, an increase in strength, and improvement in durability. When the mixing amount of the dispersant of the present invention is 0.01% by weight or more, the dispersion performance can be sufficiently exerted. In contrast, when the mixing amount of the dispersant of the present invention is 10.0% by weight or less, the dispersant may be economically advantageous without substantially saturating an effect of improving the dispersibility. An adverse effect on various properties of mortar and concrete such as a delay in hardening and a decrease in strength may be suppressed.

The cement composition can exert high dispersibility and dispersion retention capability even at a high water reduction ratio region. Further, the cement composition can exert sufficient initial dispersibility and viscosity-reducing properties even at low temperature, and have excellent workability. Therefore, the cement composition that is hardened is effective for a variety of raw materials for concrete. Examples of the concrete may include ready-mixed concrete, concrete for a concrete secondary product (precast concrete), concrete for centrifugal casting, concrete for vibrocompaction, steam curing concrete, and spraying concrete. Further examples thereof may include mortar or concrete that requires high fluidity, such as medium fluidity concrete (concrete having a slump value of 22 cm to 25 cm), high fluidity concrete (concrete having a slump value of 25 cm or more and a slump flow value of 50 cm to 70 cm), self-compacting concrete, and a self-leveling material.

A gypsum composition (a hydraulic composition containing the dispersant of the present invention, gypsum, and water as essential components) in which gypsum is used as a hydraulic material is common, and is one of preferable embodiments of the present invention. Hereinafter, an aspect of a dispersant (gypsum dispersant) in which the hydraulic composition contains gypsum will be described. Gypsum is not particularly limited as long as it is a mineral containing calcium sulfate ($CaSO_4$) as a main component, and examples thereof may include calcium sulfate 1/2-hydrate ($CaSO_4 \cdot 1/2H_2O$: hemihydrate gypsum), calcium sulfate dihydrate ($CaSO_4 \cdot 2H_2O$: dihydrate gypsum), and calcium sulfate anhydrite ($CaSO_4$: anhydrite gypsum). The gypsum is usually hemihydrate gypsum. The gypsum may be natural gypsum or synthetic gypsum. A production area and properties of natural gypsum are not limited. Examples of synthetic gypsum may include, but are not limited to, phosphogypsum, flue-gas desulfurization gypsum, titanogypsum, metallurgy gypsum, and hydrofluorogypsum.

In the gypsum composition, the mixing amount of the dispersant of the present invention is preferably 0.01% by weight to 5.00% by weight, more preferably 0.02% by weight to 3.00% by weight, and further preferably 0.04% by weight to 1.00% by weight, in terms of solid content relative to the weight of the gypsum.

The contained amount of water in the gypsum composition can be appropriately determined, and is usually 20% by weight or more, and preferably 40% by weight or more, relative to the weight of the gypsum. The upper limit thereof is usually 150% by weight or less, and preferably 100% by weight or less. The gypsum composition may contain gypsum, water, and a usually used additive other than the dispersant of the present invention.

When the gypsum composition is subjected to a hardening treatment such as heating and drying, the gypsum composition can be used for a building material such as a gypsum board or gypsum plaster, constructional material for tunnel reinforcement and ground improvement, a casting and molding material for pottery, a dental casting material, a gypsum casting material, or the like.

3-3. Other Active Component

When the dispersant of the present invention is used as a cement dispersant, the dispersant only needs to contain a lignin derivative compound which is an active component thereof. The dispersant may contain an active component of another cement dispersant or an active component of another concrete additive, or the dispersant of the present invention may be used in combination with another cement dispersant or another concrete additive.

Examples of the active component of the other cement dispersant and the active component of the other concrete additive that can be used may include the followings:

Lignosulfonates;
polyol derivatives;
naphthalenesulfonic acid formalin condensates;
melamine sulfonate formalin condensates;
polystyrene sulfonic acid salts;
aminosulfonic acid-based compounds such as aminoarylsulfonic acid-phenol-formaldehyde condensates (see, for example, Japanese Patent Application Laid-Open No. Hei. 1-113419 A);
compositions comprising an (a) component which is at least one of a copolymer of a polyalkylene glycol mono(meth)acrylic acid ester-based compound and a (meth)acrylic acid-based compound and a salt thereof, a (b) component which is at least one selected from the group consisting of a copolymer of a polyalkylene glycol mono(meth)allyl ether-based compound and maleic anhydride, a hydrolyzed product thereof, and a salt thereof, and a (c) component which is at least one of a copolymer of a polyalkylene glycol mono(meth) allyl ether-based compound and a maleic acid ester of a polyalkylene glycol-based compound and a salt thereof (see, for example, Japanese Patent Application Laid-Open No. Hei. 7-267705 A);
compositions comprising an A component which is a component comprising a copolymer of (meth)acrylic acid polyalkylene glycol ester and (meth)acrylic acid (salt), a B component which is a component comprising a specific polyethylene glycol polypropylene glycol-based compound, and a C component which is a component comprising a specific surfactant (see, for example, Japanese Patent No. 2508113);
vinyl copolymers containing respective constituent units of a polyethylene (propylene) glycol ester or a polyethylene (propylene) glycol mono(meth)allyl ether of (meth)acrylic acid, (meth)allyl sulfonic acid (salt), and (meth)acrylic acid (salt) (see, for example, Japanese Patent Application Laid-Open No. Sho. 62-216950 A);
water-soluble vinyl copolymers obtained by polymerizing a polyethylene (propylene) glycol ester of (meth) acrylic acid, (meth)allylsulfonic acid (salt), and (meth) acrylic acid (salt) in an aqueous solution (see, for example, Japanese Patent Application Laid-Open No. Hei. 1-226757 A);
copolymers obtained from a polyethylene (propylene) glycol ester of (meth) acrylic acid, (meth)allylsulfonic acid (salt) or p-(meth)allyloxybenzenesulfonic acid (salt), and (meth)acrylic acid (salt) (see, for example, Japanese Patent Application Laid-Open No. Hei. 5-36377 A);
copolymers having respective monomer units formed from a polyethylene glycol mono(meth)allyl ether and maleic acid (salt) (see, for example, Japanese Patent Application Laid-Open No. Hei. 4-149056 A);
graft copolymers constituted by a constituent unit derived from a polyethylene glycol ester of (meth)acrylic acid, a constituent unit derived from (meth)allylsulfonic acid (salt), a constituent unit derived from (meth)acrylic acid (salt), a constituent unit derived from alkanediol mono(meth)acrylate or polyalkylene glycol mono (meth)acrylate and including a polymer block obtained by radical polymerization of an $\alpha,\beta$-unsaturated monomer having an amide group in the molecule (see, for example, Japanese Patent Application Laid-Open No. Hei. 5-170501 A);
water-soluble vinyl copolymers obtained by water-based radical copolymerization of a polyethylene glycol mono(meth)allyl ether, a polyethylene glycol mono (meth)acrylate, a (meth)acrylic acid alkyl ester, (meth) acrylic acid (salt), and (meth)allyl sulfonic acid (salt) or p-(meth)allyloxybenzenesulfonic acid (salt) (see, for example, Japanese Patent Application Laid-Open No. Hei. 6-191918);
copolymers obtained using a polyethylene glycol monoallyl ether, a maleic acid-based monomer, and a monomer copolymerizable with these monomers (see, for example, Japanese Examined Patent Publication No. Sho. 58-38380);
copolymers obtained by neutralizing a copolymer, obtained by using a polyalkylene glycol mono(meth) acrylic acid ester-based monomer, a (meth)acrylic acid-based monomer, and a monomer copolymerizable with these monomer, using an alkaline substance (see, for example, Japanese Examined Patent Publication No. Sho. 59-18338);
polymers obtained by using a polyalkylene glycol (meth) acrylic acid ester having a sulfonic acid group and, as necessary, a monomer copolymerizable with this monomer, or polymers obtained by neutralizing the foregoing polymer with an alkaline substance (see, for example, Japanese Patent Application Laid-Open No. Sho. 62-119147);

esterification reaction products of a copolymer of an alkoxy polyalkylene glycol monoallyl ether and maleic anhydride with a polyalkylene oxide derivative having an alkenyl group at the terminal thereof (see, for example, Japanese Patent Application Laid-Open No. Hei. 6-271347);

esterification reaction products of a copolymer of an alkoxy polyalkylene glycol monoallyl ether and maleic anhydride with a polyalkylene oxide derivative having a hydroxy group at the terminal thereof (see, for example, Japanese Patent Laid-Open No. Hei. 6-298555); and polycarboxylic acids (salts) of a copolymer composed of an alkenyl ether-based monomer which is obtained by adding ethylene oxide or the like to a specific unsaturated alcohol such as 3-methyl-3-butene-1-ol, an unsaturated carboxylic acid-based monomer, and a monomer copolymerizable with these monomers, or salts thereof (see, for example, Japanese Patent Application Laid-Open No. Sho. 62-68806).

As the active component of these cement dispersants and the active component of other concrete additives, one type thereof may be solely used, and two or more types thereof may also be used in combination.

Examples of the other cement dispersants and other concrete additives may include a water-soluble macromolecular substance, a macromolecular emulsion, an air entraining agent, a cement wetting agent, a swelling agent, a waterproofing agent, a retardant, a thickener, a flocculant, a dry-shrinkage reducing agent, a strength enhancing agent, an effect accelerator, a defoamer, an AE agent, a separation reducing agent, a self-leveling agent, a rust inhibitor, a coloring agent, a fungicide, and other surfactants. As these agents, one type thereof may be solely used, and two or more types thereof may also be used in combination. Examples of these additives may include those exemplified in (1) to (11) below.

(1) Water-Soluble Macromolecular Substance:
   unsaturated carboxylic acid polymers such as polyacrylic acid or a salt thereof (for example, sodium salt), polymethacrylic acid or a salt thereof (for example, sodium salt), polymaleic acid or a salt thereof (for example, sodium salt), and acrylic acid-maleic acid copolymer or a salt thereof (for example, sodium salt);
   nonionic cellulose ethers such as methylcellulose, ethylcellulose, hydroxymethylcellulose, hydroxyethylcellulose, carboxymethylcellulose, carboxyethylcellulose, and hydroxypropylcellulose;
   polysaccharide derivatives having alkylated or hydroxyalkylated derivatives of polysaccharides (for example, methylcellulose, ethylcellulose, hydroxyethylcellulose, and hydroxypropylcellulose) as a skeleton, wherein some or all of the hydrogen atoms of the hydroxy group are substituted with a hydrophobic substituent having a partial structure of a hydrocarbon chain of 8 to 40 carbon atoms and an ionic hydrophilic substituent having a sulfonic acid group or a salt thereof as a partial structure;
   polysaccharides produced by microbial fermentation, such as yeast glucan, xanthan gum, and β-1,3 glucans (may be linear or branched, for example, curdlan, paramylon, pachyman, scleroglucan, and laminaran);
   polyacrylamides;
   polyvinyl alcohols;
   starch;
   starch phosphoric acid esters;
   sodium alginate;
   gelatin; and
   copolymers of acrylic acid having an amino group in the molecule and quaternary compounds thereof.

(2) Macromolecular Emulsion:
   copolymers of various types of vinyl monomers such as alkyl (meth)acrylate.

(3) Hardening Retarders Other than an Axycarboxylic Acid-Based Compound:
   saccharides such as monosaccharides (for example, glucose, fructose, galactose, sucrose, xylose, apiose, ribose, and isomerized saccharide), disaccharides, trisaccharides, oligosaccharides (for example, dextrin), polysaccharides (for example, dextran), and sugar compositions containing at least any of these (for example, molasses);
   sugar alcohols such as sorbitol;
   magnesium fluorosilicate;
   phosphoric acid and a salt thereof or boric acid esters;
   aminocarboxylic acids and a salt thereof;
   alkaline soluble proteins;
   humic acid;
   tannic acid;
   phenol;
   polyhydric alcohols such as glycerin; and
   phosphonic acids such as phosphonic acid, aminotri(methylenephosphonic acid), 1-hydroxyethylidene-1,1-diphosphonic acid, ethylenediaminetetra(methylenephosphonic acid), diethylenetriaminepenta (methylenephosphonic acid), alkali metal salts and alkaline earth metal salts thereof, and derivatives thereof.

(4) High-Early-Strength Agent and Accelerator:
   soluble calcium salts such as calcium chloride, calcium nitrite, calcium nitrate, calcium bromide, and calcium iodide;
   chlorides such as iron chloride and magnesium chloride;
   sulfates;
   potassium hydroxide;
   sodium hydroxide;
   carbonates;
   thiosulfates;
   formic acid and formic acid salts such as calcium formate;
   alkanol amine;
   alumina cement; and
   calcium aluminate silicate.

(5) Defoamer Other than Oxyalkylene-Based Defoamer:
   mineral oil-based defoamers such as kerosene and liquid paraffin;
   oil-based defoamers such as animal and plant oils, sesame oil, castor oil, and alkylene oxide addition products thereof;
   fatty acid-based defoamers such as oleic acid, stearic acid, and alkylene oxide addition products thereof;
   fatty acid ester-based defoamers such as glycerol monoricinoleate, alkenylsuccinic acid derivatives, sorbitol monolaurate, sorbitol trioleate, and natural wax;
   alcohol-based defoamers such as octyl alcohol, hexadecyl alcohol, acetylene alcohol, and glycols;
   amide-based defoamers such as acrylate polyamine;
   phosphoric acid ester-based defoamers such as tributyl phosphate and sodium octyl phosphate;
   metal soap-based defoamers such as aluminum stearate and calcium oleate; and silicone-based defoamers such as dimethyl silicone oil, silicone paste, silicone emulsion, organic modified polysiloxane (polydiorganosiloxane such as dimethyl polysiloxane), and fluorosilicone oil.

(6) AE Agent:
  resin soaps;
  saturated or unsaturated fatty acids;
  sodium hydroxystearate;
  lauryl sulfate, alkylbenzenesulfonic acid (ABS), linear alkylbenzenesulfonic acid (LAS), alkanesulfonate, polyoxyethylene alkyl(phenyl) ether, polyoxyethylene alkyl(phenyl) ether sulfate ester and salts thereof;
  polyoxyethylene alkyl(phenyl) ether phosphate ester or a salt thereof;
  protein materials;
  alkenylsulfosuccinc acid; and
  α-olefin sulfonate.

(7) Another Surfactant:
  aliphatic monohydric alcohols of 6 to 30 carbon atoms in the molecule such as octadecyl alcohol and stearyl alcohol;
  alicyclic monohydric alcohols of 6 to 30 carbon atoms in the molecule such as abiethyl alcohol;
  monovalent mercaptans of 6 to 30 carbon atoms in the molecule such as dodecyl mercaptan;
  alkyl phenols of 6 to 30 carbon atoms in the molecule such as nonylphenol;
  amines of 6 to 30 carbon atoms in the molecule such as dodecyl amine;
  polyalkylene oxide derivatives in which 10 mol or more of alkylene oxide such as ethylene oxide and propylene oxide is added to carboxylic acid of 6 to 30 carbon atoms in the molecule such as lauric acid and stearic acid;
  alkyl diphenyl ether sulfonic acid salts that may have a substituent such as an alkyl group and an alkoxy group and in which two phenyl groups having a sulfone group are bonded to form an ether bond;
  various anionic surfactants other than those described above;
  various cationic surfactants such as alkyl amine acetate and alkyl trimethyl ammonium chloride;
  various nonionic surfactants; and
  various amphoteric surfactants.

(8) Water Proofing Agent:
  fatty acid (salts), fatty acid esters, oils and fats, silicone, paraffin, asphalt, and waxes.

(9) Anti-Rust Agent:
  nitrites, phosphates, and zinc oxide.

(10) Cracking Reducing Agent:
  polyoxyethylene alkyl ethers.

(11) Expansive Material:
  Ettringite-based and coal-based materials.

The dispersant of the present invention may be used in combination with an oxycarboxylic acid-based compound in addition to the aforementioned other cement dispersants and other additives for concrete. This makes it possible to exhibit higher dispersion retention capability even in a high-temperature environment.

As the oxycarboxylic acid-based compound, an oxycarboxylic acid of 4 to 10 carbon atoms or a salt thereof is preferable, and specifically, examples thereof may include gluconic acid, glucoheptonic acid, arabonic acid, malic acid, citric acid, and inorganic or organic salts such as sodium, potassium, calcium, magnesium, ammonium, triethanolamine, or the like salts. As these oxycarboxylic acid-based compounds, one type thereof may be solely used, and two or more types thereof may also be used in combination. Among these oxycarboxylic acid-based compounds, gluconic acid or a salt thereof is suitable. In the case of poor mix concrete, it is preferable to use a lignosulfonate-based dispersant as a sulfonic acid-based dispersant having a sulfo group in the molecule, and to use gluconic acid or a salt thereof as an oxycarboxylic acid-based compound.

When the dispersant of the present invention is used in combination with one or more compounds selected from the other additives consisting of the aforementioned other cement dispersant and other concrete additives, the mixing ratio of the dispersant of the present invention and the other additives (i.e., the weight ratio of the dispersant of the present invention/other additive in terms of solid content) is preferably 1 to 99/99 to 1, more preferably 5 to 95/95 to 5, still more preferably 10 to 90/90 to 10, and still more preferably 20 to 80/80 to 20. When the lignin derivative compound (dispersant) of the present invention and the oxycarboxylic acid-based compound are used in combination, the mixing ratio of the dispersant of the present invention and the oxycarboxylic acid-based compound (i.e., the weight ratio of the dispersant of the present invention/oxycarboxylic acid-based compound in terms of solid content) is preferably 1 to 99/99 to 1, more preferably 5 to 95/95 to 5, still more preferably 10 to 90/10, and still more preferably 20 to 80/80 to 20. Further, when the three components of the dispersant of the present invention, the aforementioned other additive, and the oxycarboxylic acid-based compound are used in combination, the mixing ratio of the dispersant of the present invention, the other additive, and the oxycarboxylic acid-based compound (i.e., the weight ratio of the dispersant of the present invention/other additive/oxycarboxylic acid-based compound in terms of solid content) is preferably from 1 to 98/1 to 98/1 to 98, more preferably from 5 to 90/5 to 90/5 to 90, more preferably from 10 to 90/5 to 85/5 to 85, and still more preferably from 20 to 80/10 to 70/10 to 70.

4. Muddy Water Dispersant for Oil Field Drilling

The dispersant of the present invention can be used as a muddy water dispersant for oil field drilling. Oil field drilling mud may be mud used as a fluid that circulates inside a well during an oil field drilling operation and/or a collecting operation. The composition thereof is not particularly limited. The oil field drilling mud is generally classified into an aqueous type and an oil type. Aqueous drilling mud is preferable. The aqueous drilling mud usually contains clay. Examples of the clay may include montmorillonite and bentonite. Bentonite is preferable. The pH of the oil field drilling mud is not particularly limited, and is preferably 9 to 13, more preferably 9.5 to 11.5, and further preferably approximately 11. The temperature of the oil field drilling mud is not particularly limited, and the temperature may be high temperature (for example, 80° C. or higher, and preferably 90° C. or higher). The addition amount of the dispersant of the present invention to the oil field drilling mud is preferably 0.1% by weight or more, and more preferably 0.5% by weight or more, relative to the weight of clay in the drilling mud. The upper limit thereof is preferably 30% by weight or less, and more preferably 20% by weight or less.

5. Dye Dispersant

The dispersant of the present invention can be used as a dye dispersant. Examples of a dye may include disperse dyes that are used by dispersion in a solvent, including azo-based disperse dyes such as C. I. Disperse Red 17 and anthraquinone-based disperse dyes such as C. I. Disperse Red 60. A material to be dyed is not particularly limited, and may be cloth or paper. The material to be dyed is preferably a material obtained after a high-temperature dyeing process (for example, 100° C. or higher, 110° C. or higher, and 120° C. or higher), or a synthetic fiber (for example, polyester, acetate, and nylon). A temperature condition during high-temperature dyeing is not particularly limited. The addition amount of the dispersant of the present invention to a dye is preferably 1% by weight or more, and more preferably 5% by weight or more, relative to the weight of the dye in a dye solution. The upper limit thereof is preferably 100% by weight or less, and more preferably 70% by weight or less. A dye composition containing the dye and the dye dispersant can be used as an ink or a coating material in uses of dyeing a variety of materials. The dye composition may contain an optional additive according to a variety of uses.

EXAMPLES

Hereinafter, examples will be given to explain the present invention in more detail, but the present invention is not limited to the following examples, and may be implemented with appropriate modifications to the extent that they can conform to the purport of the preceding and following descriptions, all of which are included in the technical scope of the present invention. In the examples, unless otherwise specified, "%" represents percent by weight, and "part" represents part by weight.

Example 1

Production of Lignin Derivative Compound (1)

In a glass reaction container equipped with a thermometer, a stirrer, a reflux condenser, and a dropping device, 236 g of water, 92 g of poly(ethyleneoxide) monophenyl ether (EO addition molar number: 100), 5 g of p-hydroxybenzoic acid, 11 g of aniline sulfonic acid, 60 g of SUNFLO RH (lignosulfonate, manufactured by Nippon Paper Industries Co., Ltd.), 13 g of a 37% formaldehyde aqueous solution, 55 g of a 72% sulfuric acid aqueous solution, and 0.05 g of a defoamer, PRONAL 753 (manufactured by TOHO Chemical Industry Co., Ltd.) were charged, and the temperature of the reaction container was increased to 105° C. with stirring of the mixture. The reaction was completed at a liquid temperature of 105° C. in 10 hours. After the completion of the reaction, 93 g of a 250 g/L calcium hydroxide aqueous solution and 24 g of a 31% sodium hydroxide aqueous solution were added to the reaction container, and the mixture was stirred for additional 1 hour. The mixture was filtered to remove gypsum produced by neutralization, and as a result, a lignin derivative compound (1) of the present invention composed of a copolymer having a weight-average molecular weight of 45,300 was obtained. A GPC chart of the obtained lignin derivative compound (1) (measured by a UV absorbance detector at a wavelength of 280 nm) is shown in FIG. 1. In FIG. 1, the ordinate represents the detection intensity, and the abscissa represents the retention time. The reaction weight ratio [L]/[M] of the lignin sulfonic acid-based compound [L] and the aromatic water-soluble compound [M] was 36/64, and the reaction rate of the aromatic water-soluble compound was 85%.

Example 2

Production of Lignin Derivative Compound (2)

In a glass reaction container equipped with a thermometer, a stirrer, a reflux condenser, and a dropping device, 229 g of water, 92 g of poly(ethyleneoxide) monophenyl ether (EO addition molar number: 50), 60 g of SUNFLO RH (lignosulfonate, manufactured by Nippon Paper Industries Co., Ltd.), 13 g of a 37% formaldehyde aqueous solution, 55 g of a 72% sulfuric acid aqueous solution, and 0.05 g of a defoamer, PRONAL 753 (manufactured by TOHO Chemical Industry Co., Ltd.) were charged, and the temperature of the reaction container was increased to 105° C. with stirring of the mixture. The reaction was completed at a liquid temperature of 105° C. in 6 hours. After the completion of the reaction, the temperature of the reaction product was decreased to 90° C. Then, 93 g of a 250 g/L calcium hydroxide aqueous solution and 24 g of a 31% sodium hydroxide aqueous solution were added to the reaction container, and the mixture was stirred for additional 1 hour. The mixture was filtered to remove gypsum produced by neutralization, and as a result, a lignin derivative compound (2) of the present invention composed of a copolymer having a weight-average molecular weight of 41,300 was obtained. The reaction weight ratio [L]/[M] of the lignin sulfonic acid-based compound [L] and the aromatic water-soluble compound [M] was 39/61, and the reaction rate of the aromatic water-soluble compound was 95%.

Example 3

Production of Lignin Derivative Compound (3)

In a glass reaction container equipped with a thermometer, a stirrer, a reflux condenser, and a dropping device, 283 g of water, 92 g of poly(ethyleneoxide) monophenyl ether (EO addition molar number: 25), 80 g of SUNFLO RH (lignosulfonate, manufactured by Nippon Paper Industries Co., Ltd.), 12 g of a 37% formaldehyde aqueous solution, 72 g of a 72% sulfuric acid aqueous solution, and 0.05 g of a defoamer, PRONAL 753 (manufactured by TOHO Chemical Industry Co., Ltd.) were charged, and the temperature of the reaction container was increased to 105° C. with stirring of the mixture. The reaction was completed at a liquid temperature of 105° C. in 10 hours. After the reaction liquid had been cooled, 95 g of a 250 g/L calcium hydroxide aqueous solution and 25 g of a 31% sodium hydroxide aqueous solution were added to the reaction container. The mixture was filtered to remove gypsum produced by neutralization, and as a result, a lignin derivative compound (3) of the present invention composed of a copolymer having a weight-average molecular weight of 26,900 was obtained. The reaction weight ratio [L]/[M] of the lignin sulfonic acid-based compound [L] and the aromatic water-soluble compound [M] was 47/53, and the reaction rate of the aromatic water-soluble compound was 81%.

Example 4

Production of Lignin Derivative Compound (4)

In a glass reaction container equipped with a thermometer, a stirrer, a reflux condenser, and a dropping device, 229 g of water, 92 g of poly(propyleneoxide) monophenyl ether (PO addition molar number: 130), 22 g of SUNFLO RH (lignosulfonate, manufactured by Nippon Paper Industries Co., Ltd.), 10 g of p-hydroxybenzoic acid, 13 g of a 37% formaldehyde aqueous solution, 55 g of a 72% sulfuric acid aqueous solution, and 0.05 g of a defoamer, PRONAL 753 (manufactured by TOHO Chemical Industry Co., Ltd.) were charged, and the temperature of the reaction container was increased to 105° C. with stirring of the mixture. The reaction was completed at a liquid temperature of 105° C. in 14 hours. After the completion of the reaction, the temperature of the reaction product was decreased to 90° C. Then, 54 g of a 31% sodium hydroxide aqueous solution was added to the reaction container, and the mixture was stirred for additional 1 hour. The mixture was filtered to remove gypsum produced by neutralization, and as a result, a lignin derivative compound (4) of the present invention composed of a copolymer having a weight-average molecular weight of 21,200 was obtained. The reaction weight ratio [L]/[M] of the lignin sulfonic acid-based compound [L] and the aromatic water-soluble compound [M] was 18/82, and the reaction rate of the aromatic water-soluble compound was 88%.

Example 5

Production of Lignin Derivative Compound (5)

In a glass reaction container equipped with a thermometer, a stirrer, a reflux condenser, and a dropping device, 229 g of water, 92 g of poly(ethyleneoxide) monophenyl ether (EO addition molar number: 50), 60 g of PEARLLEX NP (lignosulfonate, manufactured by Nippon Paper Industries Co., Ltd.), 13 g of a 37% formaldehyde aqueous solution, 55 g of a 72% sulfuric acid aqueous solution, and 0.05 g of a defoamer, PRONAL 753 (manufactured by TOHO Chemical Industry Co., Ltd.) were charged, and the temperature of the reaction container was increased to 105° C. with stirring of the mixture. The reaction was completed at a liquid temperature of 105° C. in 3 hours. After the completion of the reaction, 72 g of a 250 g/L calcium hydroxide aqueous solution and 24 g of a 31% sodium hydroxide aqueous solution were added to the reaction container, and the mixture was stirred for additional 1 hour. The mixture was filtered to remove gypsum produced by neutralization, and as a result, a lignin derivative compound (5) of the present invention composed of a copolymer having a weight-average molecular weight of 39,700 was obtained. The reaction weight ratio [L]/[M] of the lignin sulfonic acid-based compound [L] and the aromatic water-soluble compound [M] was 39/61, and the reaction rate of the aromatic water-soluble compound was 95%.

Example 6

Production of Lignin Derivative Compound (6)

In a glass reaction container equipped with a thermometer, a stirrer, a reflux condenser, and a dropping device, 229 g of water, 82 g of poly(ethyleneoxide) monophenyl ether (EO addition molar number: 50), 70 g of SUNFLO RH (lignosulfonate, manufactured by Nippon Paper Industries Co., Ltd.), 13 g of a 37% formaldehyde aqueous solution, 55 g of a 72% sulfuric acid aqueous solution, and 0.05 g of a defoamer, PRONAL 753 (manufactured by TOHO Chemical Industry Co., Ltd.) were charged, and the temperature of the reaction container was increased to 120° C. with stirring of the mixture. The reaction was completed at a liquid temperature of 120° C. in 2 hours. After the completion of the reaction, the temperature of the reaction product was decreased to 50° C. Then, 93 g of a 250 g/L calcium hydroxide aqueous solution and 24 g of a 31% sodium hydroxide aqueous solution were added to the reaction container, and the mixture was stirred for additional 2 hours. The mixture was filtered to remove gypsum produced by neutralization, and as a result, a lignin derivative compound (6) of the present invention composed of a copolymer having a weight-average molecular weight of 34,400 was obtained. The reaction weight ratio [L]/[M] of the lignin sulfonic acid-based compound [L] and the aromatic water-soluble compound [M] was 46/54, and the reaction rate of the aromatic water-soluble compound was 91%.

Example 7

Production of Lignin Derivative Compound (7)

In a glass reaction container equipped with a thermometer, a stirrer, a reflux condenser, and a dropping device, 229 g of water, 122 g of poly(ethyleneoxide) monophenyl ether (EO addition molar number: 70), 20 g of VANILLEX HW (lignosulfonate, manufactured by Nippon Paper Industries Co., Ltd.), 5 g of p-hydroxybenzoic acid, 13 g of a 37% formaldehyde aqueous solution, 58 g of a 72% sulfuric acid aqueous solution, and 0.05 g of a defoamer, PRONAL 753 (manufactured by TOHO Chemical Industry Co., Ltd.) were charged, and the temperature of the reaction container was increased to 105° C. with stirring of the mixture. The reaction was completed at a liquid temperature of 105° C. in 14 hours. After the completion of the reaction, 62 g of a 250 g/L calcium hydroxide aqueous solution and 39 g of a 31% sodium hydroxide aqueous solution were added to the reaction container, and the mixture was stirred for additional 1 hour. The mixture was filtered to remove gypsum produced by neutralization, and as a result, a lignin derivative compound (7) of the present invention composed of a copolymer having a weight-average molecular weight of 16,800 was obtained. The reaction weight ratio [L]/[M] of the lignin sulfonic acid-based compound [L] and the aromatic water-soluble compound [M] was 14/86, and the reaction rate of the aromatic water-soluble compound was 86%.

Example 8

Production of Lignin Derivative Compound (8)

In a glass reaction container equipped with a thermometer, a stirrer, a reflux condenser, and a dropping device, 192 g of water, 52 g of poly(ethyleneoxide) monophenyl ether (EO addition molar number: 70), 35 g of SUNFLO RH (lignosulfonate, manufactured by Nippon Paper Industries Co., Ltd.), 10 g of aniline sulfonic acid, 11 g of a 37% formaldehyde aqueous solution, 55 g of a 72% sulfuric acid aqueous solution, and 0.05 g of a defoamer, PRONAL 753 (manufactured by TOHO Chemical Industry Co., Ltd.) were charged, and the temperature of the reaction container was increased to 105° C. with stirring of the mixture. The reaction was completed at a liquid temperature of 105° C. in 14 hours. After the completion of the reaction, 90 g of a 250 g/L calcium hydroxide aqueous solution and 24 g of a 31% sodium hydroxide aqueous solution were added to the reaction container, and the mixture was stirred for additional 1 hours. The mixture was filtered to remove gypsum produced by neutralization, and as a result, a lignin derivative compound (8) of the present invention composed of a copolymer having a weight-average molecular weight of 29,900 was obtained. The reaction weight ratio [L]/[M] of the lignin sulfonic acid-based compound [L] and the aromatic water-soluble compound [M] was 36/64, and the reaction rate of the aromatic water-soluble compound was 80%.

Example 9

Production of Lignin Derivative Compound (9)

In a glass reaction container equipped with a thermometer, a stirrer, a reflux condenser, and a dropping device, 229 g of water, 43 g of poly(ethyleneoxide) monophenyl ether (EO addition molar number: 25), 10 g of naphthalene, 90 g of SAN X M (lignosulfonate, manufactured by Nippon Paper Industries Co., Ltd.), 21 g of a 37% formaldehyde aqueous solution, 77 g of a 72% sulfuric acid aqueous solution, and 0.05 g of a defoamer, PRONAL 753 (manufactured by TOHO Chemical Industry Co., Ltd.) were charged, and the temperature of the reaction container was increased to 105° C. with stirring of the mixture. The reaction was completed at a liquid temperature of 105° C. in 8 hours. After the completion of the reaction, 52 g of a 250 g/L calcium hydroxide aqueous solution and 34 g of a 31% sodium hydroxide aqueous solution were added to the reaction container, and the mixture was stirred for additional 2 hours. The mixture was filtered to remove gypsum produced by neutralization, and as a result, a lignin derivative compound (9) of the present invention composed of a copolymer having a weight-average molecular weight of 18,300 was obtained. The reaction weight ratio [L]/[M] of the lignin sulfonic acid-based compound [L] and the aromatic water-soluble compound [M] was 63/37, and the reaction rate of the aromatic water-soluble compound was 71%.

Example 10

Production of Lignin Derivative Compound (10)

In a glass reaction container equipped with a thermometer, a stirrer, a reflux condenser, and a dropping device, 229 g of water, 92 g of poly(ethyleneoxide) monophenyl ether (EO addition molar number: 70), 57 g of SUNFLO RH (lignosulfonate, manufactured by Nippon Paper Industries Co., Ltd.), 13 g of a 37% formaldehyde aqueous solution, 55 g of a 72% sulfuric acid aqueous solution, and 0.05 g of a defoamer, PRONAL 753 (manufactured by TOHO Chemical Industry Co., Ltd.) were charged, and the temperature of the reaction container was increased to 105° C. with stirring of the mixture. The polymerization reaction was completed at a liquid temperature of 105° C. in 14 hours. After the completion of the reaction, the temperature of the reaction product was decreased to 90° C. Then, 97 g of a 250 g/L calcium hydroxide aqueous solution and 19 g of a 31% sodium hydroxide aqueous solution were added to the reaction container, and the mixture was stirred for additional 30 minutes. The mixture was filtered to remove gypsum produced by neutralization, and as a result, a lignin derivative compound (10) of the present invention composed of a copolymer having a weight-average molecular weight of 29,300 was obtained. The reaction weight ratio [L]/[M] of the lignin sulfonic acid-based compound [L] and the aromatic water-soluble compound [M] was 38/62, and the reaction rate of the aromatic water-soluble compound was 90%.

Example 11

Production of Lignin Derivative Compound (11)

In a glass reaction container equipped with a thermometer, a stirrer, a reflux condenser, and a dropping device, 275 g of water, 69 g of poly(ethyleneoxide) monophenyl ether (EO addition molar number: 50), 150 g of SUNFLO RH (lignosulfonate, manufactured by Nippon Paper Industries Co., Ltd.), 12 g of a 37% formaldehyde aqueous solution, 40 g of a 72% sulfuric acid aqueous solution, and 0.05 g of a defoamer, PRONAL 753 (manufactured by TOHO Chemical Industry Co., Ltd.) were charged, and the temperature of the reaction container was increased to 105° C. with stirring of the mixture. The reaction was completed at a liquid temperature of 105° C. in 10 hours. After the reaction liquid had been cooled, 85 g of a 250 g/L calcium hydroxide aqueous solution was added to the reaction container. The mixture was filtered to remove gypsum produced by neutralization, and as a result, a lignin derivative (3) of the present invention composed of a copolymer having a weight-average molecular weight of 22,800 was obtained. The reaction weight ratio [L]/[M] of the lignin sulfonic acid-based compound [L] and the aromatic water-soluble compound [M] was 68/32, and the reaction rate of the aromatic water-soluble compound was 89%.

Comparative Example 1

Lignin-Based Dispersant (a)

As the conventional lignin dispersant (a), SUNFLO RH (a modified lignosulfonate-based compound, manufactured by Nippon Paper Industries Co., Ltd.), was used.

Comparative Example 2

Production of Lignin Derivative (b)

According to the description of Japanese Translation of PCT Patent International Application Publication No. JP-T-2008-514402 A, in a glass reaction container equipped with a thermometer, a stirrer, a reflux condenser, a nitrogen introduction tube, and a dropping device, 98.7 g of water, 152.4 g of polyethyleneglycol mono(3-methyl-3-butenyl) ether (average addition molar number of ethylene oxide: 50), 0.3 g of acrylic acid, and 2.1 g of kraft lignin (trade number: 37095-9, manufactured by Aldrich) were charged, and the air inside the reaction container was replaced with nitrogen under stirring. The temperature under nitrogen atmosphere was increased to 58° C. After the liquid temperature reached 58° C., an aqueous solution obtained by diluting 0.5 g of a 30% hydrogen peroxide aqueous solution with 6.3 g of water was added to the reaction mixture. Immediately after that, a monomer aqueous solution obtained by diluting 9.2 g of acrylic acid with 21.5 g of water, and 32.6 g of an aqueous solution of a chain transfer agent containing 0.2 g of L-ascorbic acid and 0.4 g of 3-mercaptopropionic acid as a chain transfer agent were started to be added dropwise. The monomer aqueous solution was added dropwise over 3 hours and the chain transfer agent aqueous solution was added dropwise over 3 hours and 30 minutes. After the dropwise addition of the chain transfer agent aqueous solution was completed, the temperature was subsequently maintained at 58° C. for 2 hours, so that a comparative lignin derivative (b) composed of an aqueous solution of a copolymer having a weight-average molecular weight of 33,000 was obtained.

Comparative Example 3

Production of Aromatic Water-Soluble Compound Homopolymer (c)

Figure 2:
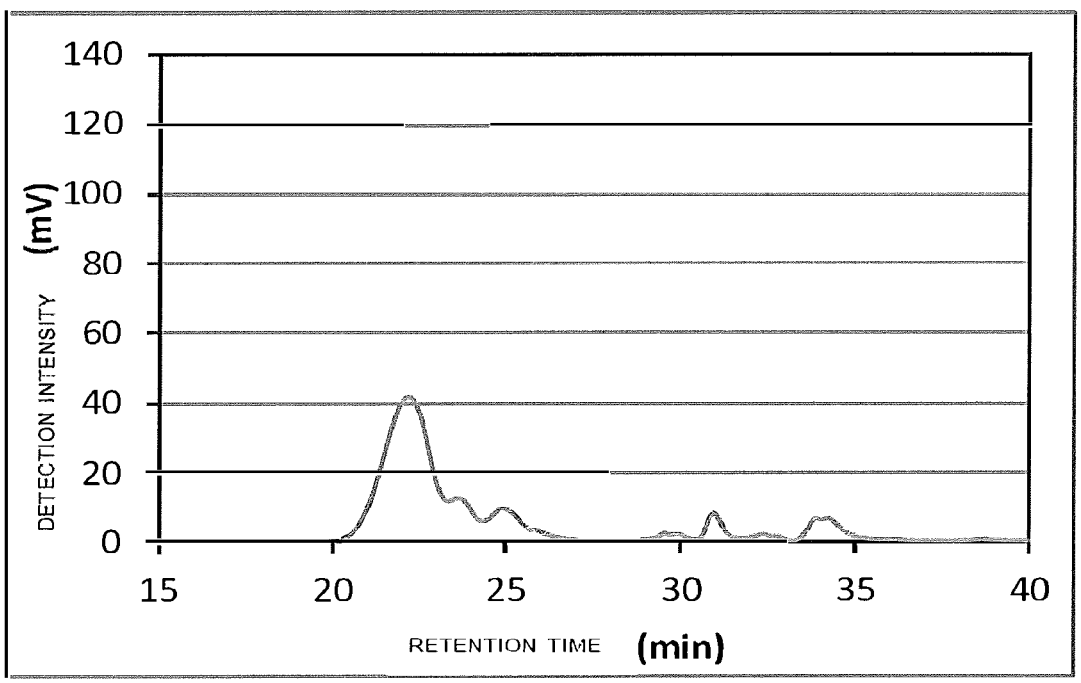
FIG. 2 is a GPC chart of a polycarboxylic acid-based dispersant obtained in Comparative Example 1, measured by UV.

A comparative aromatic water-soluble compound homopolymer (c) composed of an aqueous solution of a copolymer having a weight-average molecular weight of 31,800 was obtained by performing the same operation as that in Example 1 except that SUNFLO RH was not used. The reaction rate of the aromatic water-soluble compound was 95%. The GPC chart of the obtained aromatic water-soluble compound homopolymer (c) (measured by a UV absorbance detector at a wavelength of 230 nm) is shown in FIG. 2. In FIG. 2, the ordinate represents the detection intensity, and the abscissa represents the retention time.

The GPC charts of FIGS. 1 and 2 measured by ultraviolet rays under the same solid content condition show that the ultraviolet absorption of the polymer in the vicinity of 22 minutes of the retention time for the lignin derivative compound (1) which is the reaction product of sodium lignosulfonate and the aromatic water-soluble compound is much larger than the ultraviolet absorption of the polymer in the vicinity of 22 minutes of the retention time for the aromatic water-soluble compound homopolymer (c) which is composed of only the constituent unit of the aromatic water-soluble compound, which is for comparison. This shows that the lignin derivative compound (1) has a lignin sulfonic acid skeleton containing an aromatic ring having large ultraviolet absorption introduced into a polymer skeleton derived from the aromatic water-soluble compound. A single peak was also observed, indicating that each compound reacted to produce a lignin derivative compound.

As described above, in the lignin derivative compound (1), since the constituent units derived from poly(ethylene oxide) monophenyl ether, p-hydroxybenzoic acid, and aniline sulfonic acid, which are aromatic water-soluble compounds, are introduced into the lignin sulfonic acid, it is obvious that the lignin derivative compound (1) also has a polyethylene oxide chain and an anionic functional group (carboxyl group, sulfo group, hydroxyl group, and the like).

Comparative Example 4

1:1 Mixture (d) of Comparative Example 1 and Comparative Example 3

A 1:1 mixture (d) of Comparative Example 1 and Comparative Example 3 was produced by mixing the lignin-based dispersant (a) of Comparative Example 1 and the aromatic water-soluble compound homopolymer (c) of Comparative Example 3 at a solid content ratio of 1:1.

Comparative Example 5

Production of Polycarboxylic Acid-Based Dispersant (e)

As the polycarboxylic acid-based dispersant (e), a commercially available FLOWRIC SF-500S (manufactured by FLOWRIC Co., Ltd.) was used.

For the lignin derivative compounds (1) to (10) obtained in Examples 1 to 10, the lignin-based dispersant (a) obtained in Comparative Example 1, the lignin-based dispersant (b) obtained in Comparative Example 2, the aromatic water-soluble compound homopolymer (c) obtained in Comparative Example 3, the 1:1 mixture using Comparative Example 1 and Comparative Example 3 obtained in Comparative Example 4, and the polycarboxylic acid-based dispersant obtained in Comparative Example 5, the used aromatic water-soluble compound, the reaction weight ratio ([A]:[B]:[C]:[D]) and weight-average molecular weight of aromatic water-soluble compound, the reaction weight ratio [L]/[M] of the lignin sulfonic acid-based compound [L] and the aromatic water-soluble compound [M], and the reaction rate (%) of the aromatic water-soluble compound are each shown in Table 1.

[Table 1]

TABLE 1

|  | NAME | AROMATIC WATER-SOLUBLE COMPOUND | RATIO OF REACTION ([A]:[B]:[C]:[D]) | WEIGHT-AVERAGE MOLECULAR WEIGHT (Mw) | [L]/[M] | REACTION RATE (%) |
|---|---|---|---|---|---|---|
| EXAMPLE | 1 LIGNIN DERIVATIVE COMPOUND (1) | PEOPH100 + PHB + ANS | 85:5:10:0 | 45,300 | 36/64 | 85 |
|  | 2 LIGNIN DERIVATIVE COMPOUND (2) | PEOPH50 | 100:0:0:0 | 41,300 | 39/61 | 95 |
|  | 3 LIGNIN DERIVATIVE COMPOUND (3) | PEOPH25 | 100:0:0:0 | 26,900 | 47/53 | 81 |
|  | 4 LIGNIN DERIVATIVE COMPOUND (4) | PPOPE130 + PHB | 90:10:0:0 | 21,200 | 18/82 | 88 |
|  | 5 LIGNIN DERIVATIVE COMPOUND (5) | PEOPH50 | 100:0:0:0 | 39,700 | 39/61 | 95 |
|  | 6 LIGNIN DERIVATIVE COMPOUND (6) | PEOPH50 | 100:0:0:0 | 34,400 | 45/54 | 91 |
|  | 7 LIGNIN DERIVATIVE COMPOUND (7) | PEOPH70 + PHB | 96:4:0:0 | 16,800 | 14/80 | 86 |
|  | 8 LIGNIN DERIVATIVE COMPOUND (8) | PEOPH70 + ANS | 84:0:16:0 | 29,900 | 38/64 | 80 |
|  | 9 LIGNIN DERIVATIVE COMPOUND (9) | PEOPH25 + NAP | 81:0:0:19 | 18,300 | 63/37 | 71 |
|  | 10 LIGNIN DERIVATIVE COMPOUND (10) | PEOPH70 | 100:0:0:0 | 29,300 | 38/52 | 90 |
|  | 11 LIGNIN DERIVATIVE COMPOUND (11) | PEOPH50 | 100:0:0:0 | 22,800 | 68/32 | 89 |

TABLE 1-continued

|  | NAME | AROMATIC WATER-SOLUBLE COMPOUND | RATIO OF REACTION ([A]:[B]:[C]:[D]) | WEIGHT-AVERAGE MOLECULAR WEIGHT (Mw) | [L]/[M] | REACTION RATE (%) |
|---|---|---|---|---|---|---|
| COMPARATIVE EXAMPLE | 1 LIGNIN-BASED DISPERSANT (a) | — | — | 8,500 | 100/0 | — |
|  | 2 LIGNIN DERIVATIVE (b) | — | — | 33,000 | — | — |
|  | 3 AROMATIC WATER-SOLUBLE COMPOUND HOMOPOLYMER (c) | PEOPH100 + PHB + AHS | 85:5:10:0 | 31,800 | — | 95 |
|  | 4 1:1 MIXTURE USING COMPARATIVE EXAMPLES 1 AND 3 (d) | — | — | — | — | — |
|  | 5 POLYCARBOXYLIC ACID-BASED DISPERSANT (e) | — | — | — | — | — |

Bottom notes in Table 1
PEOPH100: poly(ethyleneoxide) monophenyl ether (EO addition molar number: 100)
PEOPH70: poly(ethyleneoxide) monophenyl ether (EO addition molar number: 70)
PEOPH50: poly(ethyleneoxide) monophenyl ether (EO addition molar number: 50)
PEOPH25: poly(ethyleneoxide) monophenyl ether (EO addition molar number: 25)
PPOPH130: poly(propyleneoxide) monophenyl ether (PO addition molar number: 130)
PHB: p-hydroxybenzoic acid
ANS: aniline sulfonic acid
NAP: naphthalene Examples 12 to 22 and Comparative Examples 6 to 10

Test of Cement Composition

A cement composition obtained by adding the sample in each of Examples 1 to 11 and Comparative Examples 1 to 5 was prepared by the following procedure. At an environment temperature (20° C.), a coarse aggregate, a fine aggregate, cement, and water that had been mixed as shown in Table 2 (a W/C of 45%), and each sample in an amount described in Table 3 were placed in a forced biaxial mixer, and mechanically kneaded with the forced biaxial mixer for 90 seconds, to obtain a cement composition (the sample was mixed with water before it was placed). The obtained cement composition was subjected to a slump test, measurement of an air content, and evaluation of viscosity and setting time by the following procedures.

<Slump Test, Measurement of Air Content, and Evaluation of Viscosity and Setting Time>

Immediately after the cement composition was discharged from the forced biaxial mixer, the cement composition was subjected to the following fresh cement composition test [slump test JIS A 1101:2014 (measurement of a distance fallen from the top of a fresh cement composition as a slump value and a flowed distance as a flow value), air content measurement test (JIS A 1128:2014), cement composition viscosity evaluation, and setting time measurement (JIS A 1147:2007)]. The viscosity of the cement composition was evaluated in accordance with the following criteria by sensory evaluation by five estimators. Test results are shown in Table 3.

<Evaluation Criteria of Viscosity>
3: appropriate viscosity is imparted to the cement composition, and bleeding is hardly observed.
2: viscosity is imparted to the cement composition, but bleeding is observed.
1: viscosity is not imparted to the cement composition, and large bleeding is observed.

TABLE 2

| W/C (%) | UNIT AMOUNT (kg/m³) | | | | |
|---|---|---|---|---|---|
|  | W | C | S1 | S2 | G |
| 45 | 180 | 400 | 433 | 429 | 878 |

Bottom notes in Table 2
C: Equivalent mixing of the following three types Ordinary portland cement (manufactured by Ube-Mitsubishi Cement Corporation, specific gravity 3.16) Ordinary portland cement (manufactured by Taiheiyo Cement Corporation, specific gravity 3.16) Ordinary portland Cement (made by Tokuyama Corporation, specific gravity 3.16)
W: Tap water
S1: Mountain sand from Kakegawa (fine aggregate, specific gravity 2.57)
S2: Crushed sand from Iwase (fine aggregate, specific gravity 2.61)
G: Crushed stone from Ome (coarse aggregate, specific gravity 2.65)

Samples (in terms of solids): see Table 3

TABLE 3

|  | CEMENT DISPERSANT | ADDITION AMOUNT (% BY WEIGHT) | SL VALUE (cm) | AIR CONTENT (% BY WEIGHT) | VISCOSITY | SETTING TIME (hh:mm) |
|---|---|---|---|---|---|---|
| EXAMPLE 12 | LIGNIN DERIVATIVE COMPOUND (1) | 0.2 | 15.0 | 1.4 | 3 | 6:25 |
| EXAMPLE 13 | LIGNIN DERIVATIVE COMPOUND (2) | 0.2 | 16.7 | 1.2 | 3 | 7:01 |
| EXAMPLE 14 | LIGNIN DERIVATIVE COMPOUND (3) | 0.2 | 14.2 | 1.2 | 3 | 6:20 |
| EXAMPLE 15 | LIGNIN DERIVATIVE COMPOUND (4) | 0.2 | 14.2 | 0.8 | 3 | 6:11 |
| EXAMPLE 16 | LIGNIN DERIVATIVE COMPOUND (5) | 0.2 | 14.8 | 0.9 | 3 | 6:44 |
| EXAMPLE 17 | LIGNIN DERIVATIVE COMPOUND (6) | 0.2 | 14.0 | 1.7 | 2 | 7:16 |
| EXAMPLE 18 | LIGNIN DERIVATIVE COMPOUND (7) | 0.2 | 15.8 | 1.3 | 2 | 6:46 |
| EXAMPLE 19 | LIGNIN DERIVATIVE COMPOUND (8) | 0.2 | 15.9 | 1.4 | 3 | 6:35 |

TABLE 3-continued

| | CEMENT DISPERSANT | ADDITION AMOUNT (% BY WEIGHT) | SL VALUE (cm) | AIR CONTENT (% BY WEIGHT) | VISCOSITY | SETTING TIME (hh:mm) |
|---|---|---|---|---|---|---|
| EXAMPLE 20 | LIGNIN DERIVATIVE COMPOUND (9) | 0.2 | 14.4 | 1.5 | 2 | 6:51 |
| EXAMPLE 21 | LIGNIN DERIVATIVE COMPOUND (10) | 0.2 | 16.5 | 1.0 | 3 | 6:09 |
| EXAMPLE 22 | LIGNIN DERIVATIVE COMPOUND (11) | 0.2 | 13.4 | 0.8 | 2 | 6:18 |
| COMPARATIVE EXAMPLE 6 | LIGNIN-BASED DISPERSANT (a) | 0.2 | 0.5 | 3.8 | 1 | — |
| | | 0.6 | 7.2 | 6.2 | 1 | 15:08 |
| COMPARATIVE EXAMPLE 7 | LIGNIN DERIVATIVE (b) | 0.2 | 1.3 | 0.9 | 1 | — |
| | | 0.6 | 10.6 | 4.2 | 1 | 12:10 |
| COMPARATIVE EXAMPLE 8 | AROMATIC WATER-SOLUBLE COMPOUND HOMOPOLYMER (c) | 0.2 | 1.8 | 1.4 | 1 | — |
| | | 0.6 | 8.8 | 6.5 | 2 | 11:41 |
| COMPARATIVE EXAMPLE 9 | 1:1 MIXTURE USING COMPARATIVE EXAMPLES 1 AND 3 (d) | 0.2 | 1.1 | 1.8 | 1 | — |
| | | 0.6 | 8.3 | 5.8 | 1 | 12:32 |
| COMPARATIVE EXAMPLE 10 | POLYCARBOXYLIC ACID-BASED DISPERSANT (e) | 0.2 | 15.2 | 1.1 | 1 | 7:45 |

Bottom notes in Table 3
Addition amount (% by weight): addition amount of the solid content of the cement dispersant relative to 100% by weight of the cement composition
SL: slump value (cm)

The followings are clear from Table 3. The flow values of mortars obtained using the lignin derivative compounds (1) to (11) and the polycarboxylic acid-based dispersant (e) in the same addition amount were compared, and it was found that the slump values were approximately the same, and a part of the lignin derivatives had higher slump value than the polycarboxylic acid-based dispersant (e). The lignin-based dispersant (a) and the lignin derivative (b) in Comparative Examples and the lignin derivative compounds (1) to (11) were compared, and it was found that the latter exhibited a significantly high slump value. This shows that the lignin derivative compound of the present invention has high dispersion performance. It can be understood that due to an addition molar number of alkylene oxide of 25 or more and high reaction rate of the aromatic water-soluble compound, high dispersibility is exerted.

When the lignin derivative compound (1) in Example 12 was compared with the mixture (d) in Comparative Example 9, this shows that the slump value in Example 12 is obviously high. The lignin derivative compound (1) is a reaction product of the lignin sulfonic acid-based compound with the aromatic water-soluble compound, and the 1:1 mixture (d) of Comparative Example 1 and Comparative Example 3 is a mixture of these. Therefore, it is clearly shown that the lignin derivative compound of the present invention exerts a performance as a result of a reaction of the lignin sulfonic acid-based compound with the aromatic water-soluble compound.

The air contents of the lignin derivative compounds (1) to (11) are largely lower than that of the conventional lignin-based dispersant (a). It is clearly shown that high air entraining performance that is a defect of the lignin-based dispersant can be suppressed.

The concrete viscosities of the lignin derivative compounds (1) to (11) can be largely improved as compared with not only the conventional lignin-based dispersant (a) but also the polycarboxylic acid-based water reducing agent (e), and has superiority in terms of a concrete state.

In addition, it can be easily understood that the setting times of the lignin derivative compounds (1) to (11) are obviously shorter than that of the conventional lignin-based dispersant (a), and thus, setting properties are more excellent than those of the polycarboxylic acid-based water reducing agent (e), and the lignin derivative compounds (1) to (11) can be suitably used as a dispersant for a secondary product of concrete or a gypsum dispersant.

Comparative Example 11

Lignin-Based Dispersant (f)

SUN X FE (manufactured by Nippon Paper Industries Co., Ltd.) was used as a conventional lignin-based muddy water dispersant for oil field drilling (f).

Examples 23 and 24 and Comparative Example 11

Test of High-Temperature Characteristics

The viscosities of mud-like compositions having a high-temperature history using the lignin derivative compounds (1) and (2) in Examples 1 and 2 and the lignin-based dispersant (f) in Comparative Example 11 were compared.

The mud-like compositions used in the test were prepared in accordance with a formulation of 100 parts of bentonite, 500 parts of pure water as water (containing a dispersant in a predetermined amount shown in Table 4), and a 30% potassium hydroxide aqueous solution as a pH modifier in which the PH was adjusted to approximately 11. A time after (immediately after) each sample in an addition amount (relative to the weight of bentonite in muddy water) shown in Table 4 was added to each of the mud-like compositions and the mixture was stirred with a homogenizer is referred to as immediately after formation of mud. Immediately after formation of mud, the viscosity at 25° C. was measured with a B-type viscometer. After that, each of the mud-like compositions was allowed to stand in a thermostatic oven at 90° C. for 4 hours, and then stirred again with a homogenizer. The viscosity at 25° C. of each of the mud-like compositions having a high-temperature history was measured. As the viscosity is lower, the dispersibility is higher. As the viscosity after the high-temperature history is lower, the dispersibility (thermal properties) at high temperature is more excellent. The results of the test of high temperature characteristics are shown in Table 4.

TABLE 4

|  | NAME | ADDITION AMOUNT (% BY WEIGHT) | VISCOSITY AT 25° C. (mPa · s) | |
|---|---|---|---|---|
|  |  |  | IMMEDIATELY AFTER FORMATION OF MUD | AFTER 4 HOURS AT 90° C. |
|  | BLANK | 3 | 1,020 | 4,000 |
| EXAMPLE 23 | LIGNIN DERIVATIVE COMPOUND (1) | 3 | 105 | 190 |
| EXAMPLE 24 | LIGNIN DERIVATIVE COMPOUND (2) | 3 | 180 | 220 |
| COMPARATIVE EXAMPLE 11 | LIGNIN-BASED DISPERSANT FOR OIL FIELD DRILLING MUD (f) | 3 | 60 | 2,600 |

Bottom notes in Table 4
Addition amount (% by weight): weight based on percent relative to the weight of bentonite As seen from Table 4, immediately after formation of mud, the viscosities of all the lignin derivative compounds (1) and (2) and the lignin-based dispersant (f) are lower, and the dispersion performance is exerted as compared with a blank in which a dispersant is not added. Table 4 shows that the lignin-based dispersant (f) in Comparative Example exerted high dispersibility immediately after formation of mud, but the viscosity after the high-temperature history (90° C., 4 hours) exhibited a largely higher value than the lignin derivative compounds (1) and (2). This shows that the dispersion performances at high temperature of the lignin derivative compounds (1) and (2) were higher. As seen from the results, the lignin derivative compound of the present invention can exert good dispersibility even at high temperature, and has excellent dispersibility regardless of a temperature condition including high temperature characteristics.

Comparative Example 12

PEARLLEX DP (manufactured by Nippon Paper Industries Co., Ltd.) was used as a conventional lignin-based dye dispersant (g).

Examples 25 to 27 and Comparative Example 12

High-Temperature Dispersibility and Staining Tests

The lignin derivative compounds (2), (5), and (8) of Examples 2, 5, and 8 and the lignin-based dye dispersant (g) of Comparative Example 12 were compared for high temperature dispersibility and staining properties to fabrics.

<Preparation of Disperse Dye Liquid>

Each sample was mixed in C. I. Disperse Red 60 so that the addition amount of a solid content was 40%, and water was added to prepare a liquid having a solid content of 35%. This liquid was crushed with a bead mill (using glass beads having a particle diameter of 1 mm), to prepare a disperse dye liquid.

<Evaluation of High-Temperature Dispersibility of Disperse Dye Liquid>

The disperse dye liquid was weighted, and diluted with pure water so that the amount of a dye was 0.24% (solid content), to prepare 250 mL of dye liquid (pH: 5.0). 10 g of polyester cloth was heated to 115° C., and dyed with a dyeing machine for 10 minutes. The dyed cloth was lightly washed with water, and visually evaluated at five stages. It is evaluated that as the evaluation point is higher, the dispersibility is better.

(Evaluation Point)
- 5: The cloth is uniformly dyed.
- 4: Uniformity is slightly poor.
- 3: A black point is found.
- 2: Many black points are found.
- 1: Significantly many black points are found.

<Evaluation of Cloth Staining Properties of Dye Dispersant>

Each of the samples was diluted with pure water so that the amount of a dye was 0.24% (solid content), to prepare 250 mL of dispersant solution (pH: 5.0). 10 g of polyester cloth was heated to 130° C., and dyed with a dyeing machine for 60 minutes. The dyed cloth was lightly washed with water, and dried with an iron, and the whiteness degree was measured with a whiteness meter (CMS-35SPX manufactured by MURAKAMI COLOR RESEARCH LABORATORY) in accordance with JIS P 8148. It is evaluated that as the whiteness degree is higher, the staining properties are lower, and the performance is better.

Examples are shown in Table 5.

TABLE 5

|  | DYE DISPERSANT | HIGH-TEMPERATURE DISPERSIBILITY | WHITENESS DEGREE |
|---|---|---|---|
| EXAMPLE 25 | LIGNIN DERIVATIVE COMPOUND (2) | 2.5 | 78 |
| EXAMPLE 26 | LIGNIN DERIVATIVE COMPOUND (5) | 3.0 | 77 |
| EXAMPLE 27 | LIGNIN DERIVATIVE COMPOUND (8) | 3.5 | 72 |
| COMPARATIVE EXAMPLE 12 | LIGNIN-BASED DYE DISPERSANT (g) | 4.0 | 67 |

As seen from Table 5, the lignin derivative compound in each of Examples has inferior high-temperature dispersibility and excellent whiteness degree, as compared with an existing lignin-based dye dispersant. As seen from the results, the lignin derivative compound of the present invention used in a dye composition also has excellent dispersibility regardless of a temperature condition including high temperature characteristics.

Comparative Example 13

Naphthalene Sulfonic Acid-Based Dispersant (h)

SUNFLO PS (manufactured by Nippon Paper Industries Co., Ltd.) was used as a conventional naphthalene sulfonic acid-based dispersant (h).

Comparative Example 14

Polycarboxylic Acid-Based Dispersant (e)

The same polycarboxylic acid-based dispersant (e) as in Comparative Example 10 was used.

Examples 28 to 30 and Comparative Examples 13 and 14

Gypsum Dispersibility Test

The dispersibilities of gypsum compositions using the lignin derivative compounds (2), (9), and (11) in Examples 2, 9, and 11, the naphthalenesulfonic acid-based dispersant (h) in Comparative Example 13, and the polycarboxylic acid-based dispersant (e) in Comparative Example 14 were compared. The dispersion flow and setting time of gypsum shown in Table 6 were evaluated as follows.
<Evaluation of Dispersibility of Gypsum>

110 g of water containing each sample in an amount of solid content of 0.035 g and 71.5 g of gypsum SK available from Mutumikagaku were mixed, and stirred with an agitator at a rotation number of 600 rpm for 20 seconds. Immediately after the stirring, a slurry was poured into a cylinder tube for flow measurement (inner diameter: 40 mm, height: 50 mm) on a glass plate, the cylinder tube was then drawn, and a flow value of the slurry was measured at two points. An average value of the flow values was considered as dispersion flow.
<Evaluation of Setting Time of Gypsum>

The setting time was measured with a Vicat needle setting time measurement device in accordance with JIS R 9112: 2015 (method of physical test for plaster of paris mold for pottery). The setting time means a time required to stop a standard needle of the measurement device at a depth of 1 mm from the surface of the sample.

TABLE 6

| | DISPERSANT FOR GYPSUM | DISPERSION FLOW (mm) | SETTING TIME (mm:ss) |
|---|---|---|---|
| EXAMPLE 28 | LIGNIN DERIVATIVE COMPOUND (2) | 156 | 6.0 |
| EXAMPLE 29 | LIGNIN DERIVATIVE COMPOUND (9) | 157 | 5.5 |
| EXAMPLE 30 | LIGNIN DERIVATIVE COMPOUND (11) | 162 | 5.5 |
| COMPARATIVE EXAMPLE 13 | NAPHTHALENE-SULFONIC ACID-BASED DISPERSANT (h) | 164 | 5.5 |
| COMPARATIVE EXAMPLE 14 | POLYCARBOXYLIC ACID-BASED DISPERSANT (e) | 167 | 7.5 |

As seen from Table 6, the lignin derivative compound in each of Examples exhibited similar dispersion flow and similar and better setting time, as compared with the existing naphthalenesulfonic acid-based dispersant (h). The lignin derivative compound exhibited inferior dispersion flow, but the setting time was shorter, as compared with the polycarboxylic acid-based dispersant (e). Thus, the working time can be decreased.

The invention claimed is:

1. A lignin derivative compound that is a reaction product of a lignin sulfonic acid-based compound with an aromatic water-soluble compound, wherein the lignin derivative compound comprises a polyalkylene oxide chain having an average addition molar number of an alkylene oxide of 25 or more,
   a reaction weight ratio ([L]/[M]) is from 70/30 to 5/95, wherein [L] is the reaction weight of the lignin sulfonic acid-based compound and [M] is the reaction weight of the aromatic water-soluble compound, and
   a peak area ratio represented by the following formula is 70% or more ([b]−[a])/[b]

wherein [b] is the gel permeation chromatography (GPC) peak area (detection wavelength: 280 nm) of the aromatic water soluble compound before the reaction and [a] is the GPC peak area of the aromatic water soluble compound after the reaction.

2. The lignin derivative compound according to claim 1, having an anionic functional group.

3. The lignin derivative compound according to claim 1, wherein the aromatic water-soluble compound comprises at least one selected from the group consisting of an aromatic compound having a polyalkyleneoxide chain, an aromatic compound having a carboxyl group, and an aromatic compound having a sulfo group.

4. A dispersant comprising the lignin derivative compound according to claim 1.

5. The dispersant according to claim 4, which is a hydraulic composition dispersant.

6. The dispersant according to claim 5, wherein the hydraulic composition dispersant is a cement dispersant or a gypsum dispersant.

7. The dispersant according to claim 4, which is a muddy water dispersant for oil field drilling.

8. The dispersant according to claim 4, which is a dye dispersant.

9. A method for producing the lignin derivative compound according to claim 1, comprising:
   reacting a lignin sulfonic acid-based compound with an aromatic water-soluble compound.

10. A hydraulic composition comprising a hydraulic material, water, and the dispersant according to claim 5.

11. The hydraulic composition according to claim 10, which is a cement composition or a gypsum composition.

* * * * *